US 6,591,667 B1

(12) United States Patent
Kotwicki et al.

(10) Patent No.: US 6,591,667 B1
(45) Date of Patent: Jul. 15, 2003

(54) METHOD OF DETERMINING THROTTLE FLOW IN A FUEL DELIVERY SYSTEM

(75) Inventors: Allan J. Kotwicki, Williamsburg, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 09/839,437

(22) Filed: Apr. 20, 2001

(51) Int. Cl.$^7$ ............................................. G01M 19/00
(52) U.S. Cl. ....................................................... 73/118.1
(58) Field of Search ................................. 73/116, 117.2, 73/117.3, 118.1, 119 A, 40, 46, 49.7

(56) References Cited

U.S. PATENT DOCUMENTS

| | | | |
|---|---|---|---|
| 4,416,149 A | 11/1983 | Kitamura et al. .............. | 73/118 |
| 4,653,453 A | 3/1987 | Kamai et al. ................ | 123/494 |
| 4,664,090 A | 5/1987 | Kabasin ...................... | 123/494 |
| 4,750,352 A | 6/1988 | Kolhoff ....................... | 73/117.3 |
| 4,856,475 A * | 8/1989 | Shimomura et al. ... | 123/339.21 |
| 4,999,781 A | 3/1991 | Holl et al. ............... | 364/431.05 |
| 5,464,000 A | 11/1995 | Pursifull et al. ............ | 123/674 |
| 5,741,964 A | 4/1998 | Mizutani ................... | 73/118.2 |

OTHER PUBLICATIONS

SAE Technical Paper Series 2000–01–0571 Ross Pursifull, Allan J. Kotwicki and Suigi Hong; *Throttle Flow Characterization*; Mar. 6–9, 2000.

* cited by examiner

Primary Examiner—Hezron Williams
Assistant Examiner—Takisha S Miller

(57) ABSTRACT

A method of determining throttle flow in a fuel delivery system is disclosed. First, a time-efficient throttle flow data collection method is described. The collection method uses a sonic nozzle flow bench to measure airflow as a function of throttle angle and pressure in a manner analogous to on-engine dynamometer throttle flow characterization. Opening each sonic nozzle combination, then recording throttle downstream pressure and computed nozzle flow allows data to be taken in a fraction of the time normally needed. In conventional methods, the estimated airflow rate as a function of throttle angle differs from the measured airflow rate because the leak area is incorrect. The method of the invention correctly determines the estimated throttle airflow rate by using a low pass filtering technique to adjust the estimated airflow rate to eventually equal the measured airflow rate, particularly at small throttle angles.

17 Claims, 18 Drawing Sheets

METHOD OF DETERMINING THROTTLE FLOW IN A FUEL DELIVERY SYSTEM

FIELD OF THE INVENTION

This invention relates to a method and apparatus for determining throttle flow in a fuel delivery system of an internal combustion engine.

DESCRIPTION OF THE RELATED ART

In conventional engine control systems, the driver controls throttle angle through a direct mechanical connection from the accelerator pedal to the engine's throttle. Motorized or "electronic" throttles eliminate this direct link and give the powertrain controller subordinate but full authority over the throttle valve.

New powertrain control system capabilities and simplifications can be achieved with full range throttle authority. Possibilities exist to make the driver's accelerator pedal control vehicle acceleration (dependent on either selection or operating regime) while the powertrain controller manages traction, vehicle speed, or some combination thereof. Engine configurations with variable engine displacement, variable valve actuation, high EGR rates, or highly agile controlled fuel-air ratio can also benefit from the wide authority given to the electronic throttle.

Using the throttle this way (i.e. in mutivariable control designs) requires accurate determination of a throttle's flow characteristic. One component of throttle flow is the amount of flow that occurs when the throttle is closed, i.e., "leak flow." Conventional methods generally do not include accurate methods for determining the amount of leak flow that occurs when the throttle is closed.

The inventors have recognized this problem and have performed studies of the characteristics of the throttle's flow in both flow laboratories and on-engine. The results of these studies indicate that at small throttle angles, area variation versus throttle angle cannot be adequately captured unless leak area is included. Flow at small angles is dominated by leak area, but the leak area effect decreases quite rapidly. Neglecting this rapid decrease in leak area causes conventional methods to over-specify angle resolution and under-specify total allowed leak area variation, as described in a paper entitled "Throttle Flow Characterization" presented at SAE 2000 World Congress, SAE paper 2000-01-0571 (Mar. 6–9, 2000), herein incorporated by reference.

In addition to the inclusion of the leak area for small throttle angles as describe in the SAE paper, the inventors have also recognized that one reason why an estimated or predicted airflow rate at small throttle angles disagrees with the measured airflow rate is that the computation of leak flow area $A_{leak}$ is incorrect. The inventors also recognize that the initial computation of the leak flow area can be revised based on the difference between the predicted or estimated airflow rate and the measured airflow rate. This revision can be effected by use of a low pass filtering technique, for example, to gradually decrease the error between the estimated airflow rate and the measured airflow rate to zero for small throttle angles.

SUMMARY OF THE INVENTION

In a powertrain control system, new capabilities and simplifications can be achieved with full range throttle authority. Possibilities exist to make the driver's acceleration pedal control vehicle acceleration (dependent on either selection or operating regime) while the powertrain controller manages traction, vehicle speed, or some combination of them. Engine configurations with variable engine displacement, variable valve actuation, high EGR rates, or highly agile controlled fuel-air ratio can also benefit from the wide authority given to the electronic throttle. Using the throttle this way (i.e., in multivariable control designs) requires accurate determination of a throttle's flow characteristic. However, the present invention recognizes that the leak flow area can be "learned" during operation of the vehicle, even when the throttle is not fully closed. The present invention also recognizes that leak flow area should be "learned" only at small throttle angles to avoid learning incorrect values.

In general, the method of the invention estimates airflow (for purposes of engine control) as a function of throttle angle and other parameters. For example, the airflow can be measured from the following: 1) pressure upstream of the throttle, 2) temperature upstream of the throttle, and 3) pressure downstream of the throttle. To this end, a throttle area (usually projected area) is calculated as a function of throttle angle. Then, a coefficient of discharge as a function of throttle angle is determined. Alternatively, a product of throttle angle and the coefficient of discharge can be determined. Using a low pass filtering technique, the leak rate based on the estimated and measured airflow rate is adjusted by utilizing an offset or addend to account for throttle flow at closed throttle. Alternatively, other well-known techniques may be utilized to drive the error between the measured and estimated airflow rate to zero.

In one aspect of the invention, a method for determining a throttle leak flow rate in a fuel delivery system comprises the steps of determining an instantaneous throttle leak flow rate based on an estimated throttle flow rate and a measured total throttle flow rate, and adjusting a throttle leak flow rate based on the instantaneous throttle leak flow rate and an estimated throttle leak flow rate until the estimated throttle flow rate approximately equals the measured total throttle flow rate.

In another aspect of the invention, a method for determining throttle flow in a fuel delivery system comprises the steps of estimating a throttle leak flow rate based on a measured throttle flow rate and an estimated throttle flow rate, generating a correction term for the estimated throttle leak flow rate, and offsetting the estimated throttle leak flow rate using the correction term until the estimated throttle leak flow is approximately equal to the measured throttle flow rate.

In yet another aspect of the invention, a method for determining throttle leak area in a fuel delivery system comprises the steps of estimating a throttle leak area, computing an imputed throttle leak area, and adjusting the estimated throttle leak area until the estimated throttle leak area is approximately equal to the inputed throttle leak area.

DESCRIPTION OF THE PREFERRED EMBODIMENT

Figure 18:
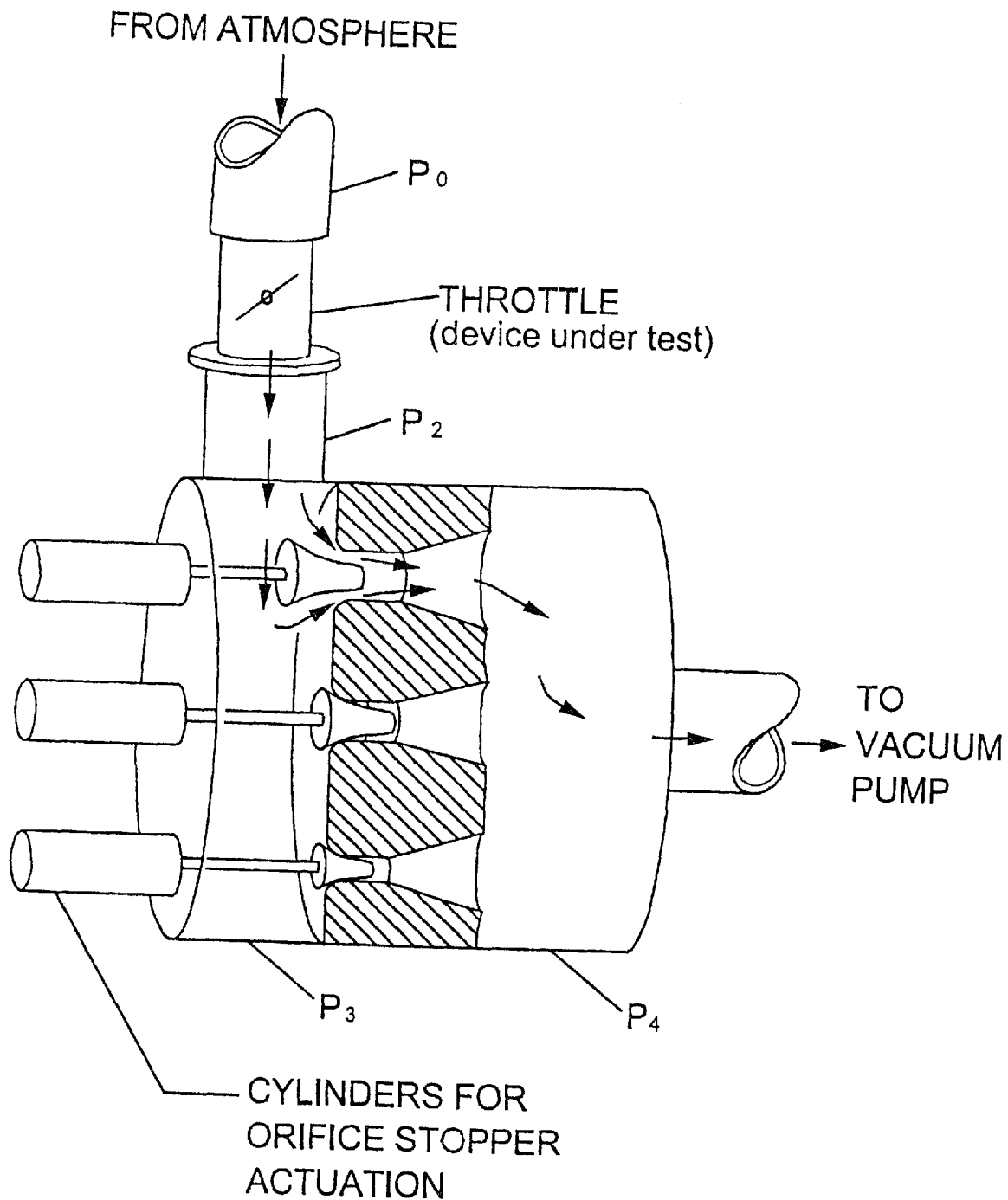
FIG. 18 shows a schematic of a sonic nozzle flow bench.

In general, the method of the invention uses a sonic nozzle flow bench to measure airflow as a function of throttle angle and pressure in a manner analogous to on-engine dynamometer throttle flow characterization. A schematic of the sonic nozzle flow bench is shown in FIG. 18. Opening each sonic nozzle combination, then recording throttle downstream pressure and computed nozzle flow allows data to be taken in a fraction of the time normally needed. Throttle flow modeling considerations are then discussed.

Many engine control systems need to estimate throttle airflow ($\dot{m}$) with throttle angle ($\theta$) and either an intake manifold pressure ($P_m$) or manifold vacuum measurement. This estimate would be embodied in a formula like Equation 1.

$$\dot{m} = f(\theta, P_m, P_0, T_0) \quad (1)$$

For any given throttle, physics and dimensional analysis also require upstream pressure ($P_0$) and temperature ($T_0$) measurements or estimates to arrive at mass flow. The throttle airflow estimate is assumed to be an instantaneous memory-less function of its parameters, with all dynamics assigned to manifold filling.

Compressible gas flow through a passage or orifice is often modeled by first stating applicable conservation laws (mass, momentum, energy, etc.), making simplifying assumptions to create an analytical model hypothesis, experimentally validating the model given the simplifying assumptions made, and adding to model complexity by removing simplifying assumptions as needed.

Figure 1:
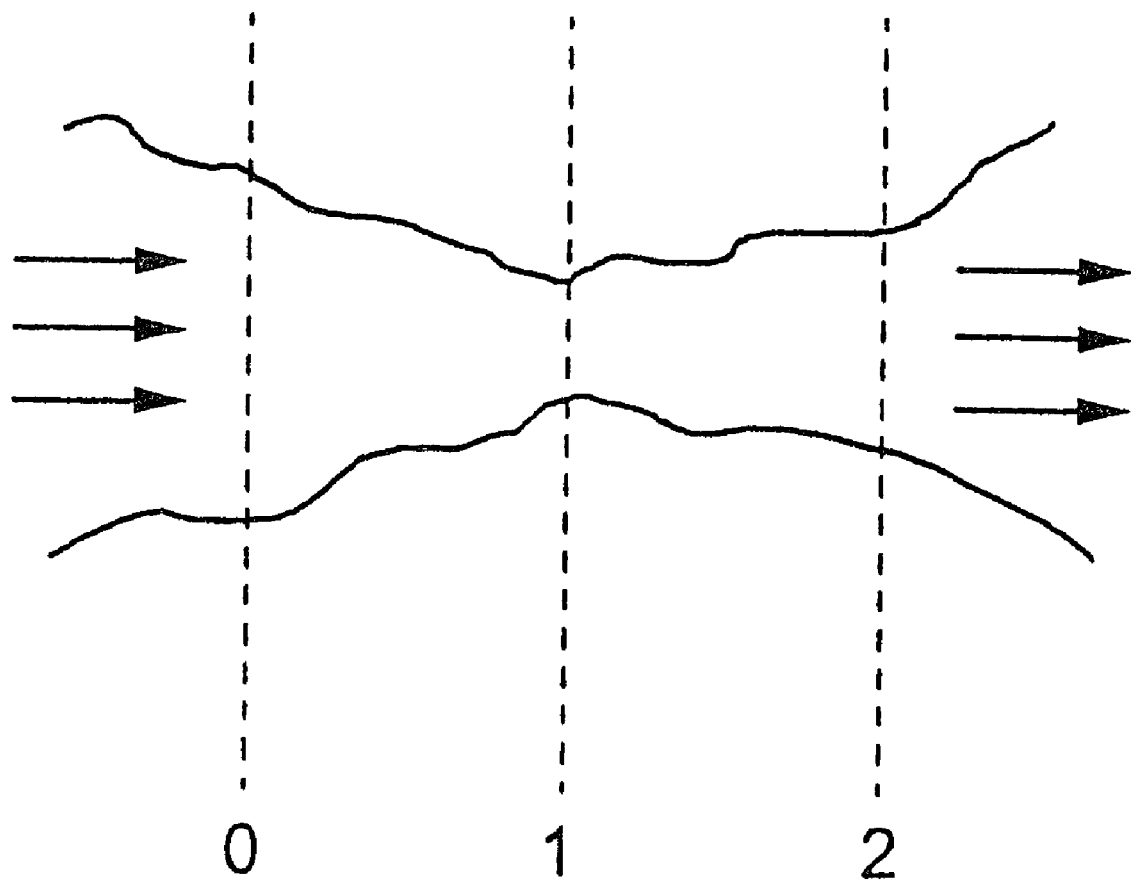
FIG. 1 shows a schematic diagram of the flow of a compressible gas through a general passage.

Referring now to FIG. 1, compressible gas mass flow through a general passage can be estimated by selecting between Equations (2) and (5) dependent on the ratio of downstream to upstream pressure. We begin the function's description in the region of lowest flow.

Subsonic Flow

Pressure ratio r is defined as the ratio of downstream to upstream pressure, $$\frac{P_2}{P_0}.$$

When pressure ratio r is above a critical value $$r > r_{crit} = \left(\frac{2}{k+1}\right)^{\frac{k}{k-1}},$$

mass flow through the passage is estimated as:

$$\dot{m} = area \cdot speed\ of\ sound \cdot upstream\ density \cdot \phi_1 \quad (2)$$
$$= A\sqrt{kRT_0}\frac{P_0}{RT_0}\sqrt{\frac{2}{k-1}}\left[\left(\frac{P_2}{P_0}\right)^{\frac{2}{k}} - \left(\frac{P_2}{P_0}\right)^{\frac{k+1}{k}}\right]$$

The critical pressure ratio is that pressure ratio at which flow velocity through the narrowest path of the passage (Location 1) is expected to reach the velocity of sound (assuming the fluid was initially at rest at Location 0).

$$r_{sonic} = \left(\frac{2}{k+1}\right)^{\frac{k}{k-1}} \quad (3)$$

Because throttle controls engine airflow, we can neglect composition changes from humidity and use air property values and a k value of 1.4. Subject to these assumptions, the critical pressure ratio for air is $$r_{sonic}|k=1.400=0.5283 \quad (4)$$

Sonic Flow

When the pressure ratio is below this critical value, flow velocity in the narrowest part of the passage reaches the velocity of sound. Although actual velocity may rise farther downstream, mass flow rate at the narrow passage ideally "chokes" or reaches a constant value. In this ideal model, downstream pressure disturbances not exceeding the critical pressure ratio do not communicate upstream. The constant "choked" mass flow rate is computed by evaluating Equation (2) using the critical or sonic pressure ratio.

$$\dot{m} = area \cdot speed\ of\ sound \cdot upstream\ density \cdot \phi_1^* \quad (5)$$
$$= A\sqrt{kRT_0}\frac{P_0}{RT_0}\sqrt{\left(\frac{2}{k-1}\right)^{\frac{k+1}{k-1}}}$$

Equations (2) and (5) were derived subject to the following simplifying assumptions:
- the flowing fluid is gas with constant specific heats obeying the ideal gas law PV=nRT
- an adiabatic thermodynamic process (no heat added or lost, gas in equilibrium at every stage)
- an isentropic process (friction free, reversible, and lossless at least in the vicinity of pressure and temperature measurements and any metering device) (It is further appropriate to note that since the velocity distribution is uniform, the streamlines are parallel and thus a vena contracta would never form. This of course is contrary to observation.)

inviscid gas (no shear stress, no friction between gas and conduit, implying a uniform velocity distribution across the conduit)

pressures and temperatures upstream and downstream are measured where gas kinetic energy is negligible.

When using either Equation (2) or (5), downstream static pressure should be measured as close as possible to the narrowest part of the passage, at Location 1 measuring $P_1$. Equations (2) and (5) were derived using static pressure $P_1$ at the smallest area; not static pressure $P_2$ far downstream. In the reference pressure ratio in the equations is defined as $$\frac{P_1}{P_0}.$$

When later examining throttle data in relation to these idealized flow equations, we do so understanding that we're normally constrained to measure pressure far downstream in the intake manifold, measuring $P_2$ at Location 2.

For a general passage, pressure recovery is the reconversion of kinetic energy back to static pressure as the gas's velocity is reversibly slowed. But throttles and sharp edged orifices are not reversible process devices, so there is little pressure recovery and we assume $P_1 \sim P_2$. With this assumption we changed pressure ratio in Equations (2) and (5) from $$\frac{P_1}{P_0} \text{ to } \frac{P_2}{P_0}.$$

There is pressure recovery in venturis and some carburetors, so $P_1 > P_2$ and pressure ratio $$\frac{P_2}{P_0}$$

measured downstream would see flow "choke" at a higher ratio than the ideal sonic pressure ratio.

Figure 2:
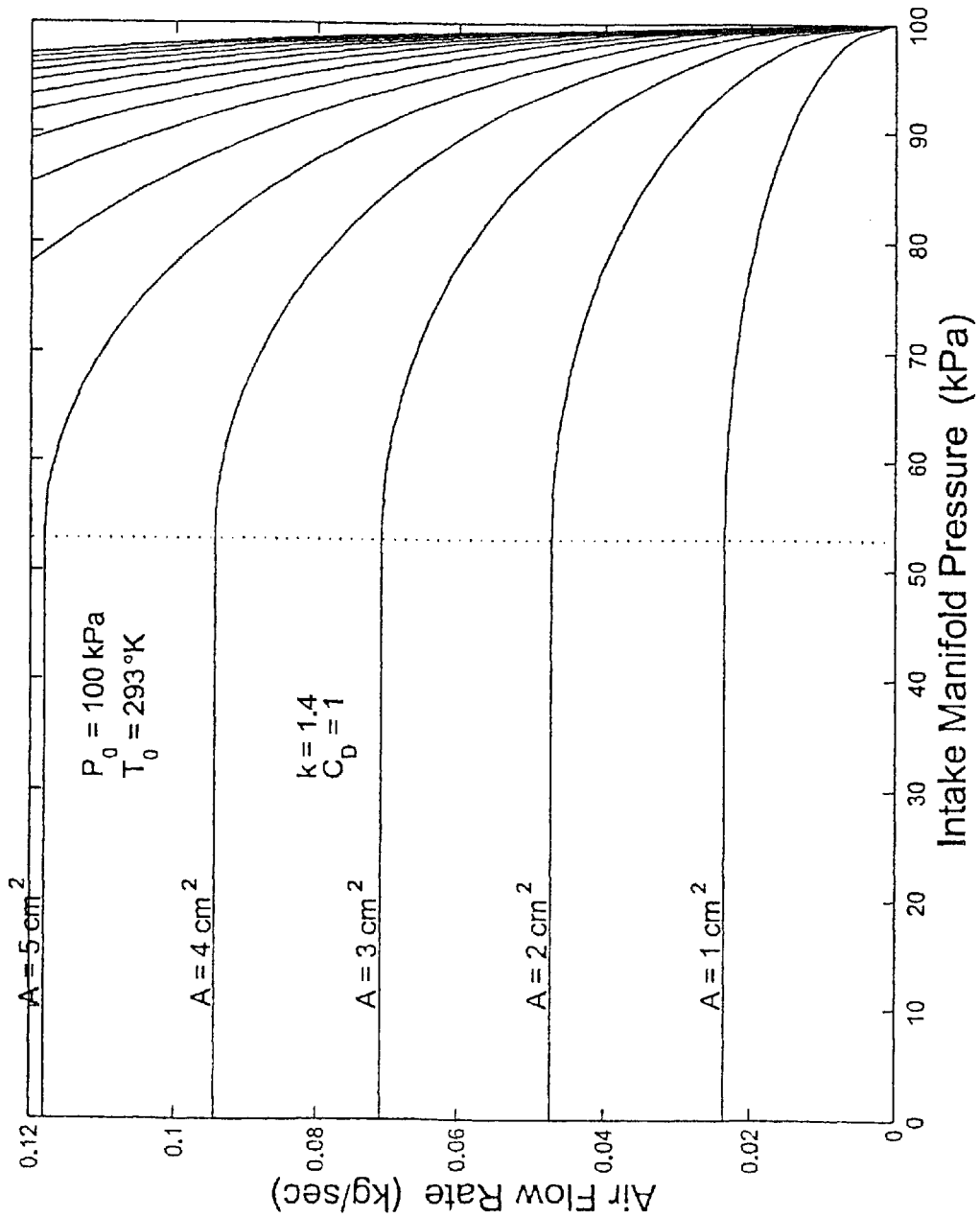
FIG. 2 shows a plot of air flow rate as a function of intake manifold pressure for constant throttle areas.

Ideal subsonic and sonic gas flow functions are plotted for a throttle with constant 20° C. and 100 kPa upstream temperature and pressure for several throttle areas in FIG. 2. The ideal model predicts that:

when $P_1 > 52.83$ kPa flow is subsonic and varies roughly as the square root of throttle pressure drop;

when $P_1 < 52.83$ kPa flow becomes sonic in the narrow passage and remains constant for larger throttle pressure drops.

Conventionally, drivers use the throttle to regulate engine power, through a non-linear but monotone increasing relation between throttle angle and area. The flow estimator will eventually be used with throttle angle, not area. This changes FIG. 2 (constant area curves) into FIG. 3 (constant angle curves), but the monotone relation makes them similar. Appendix Throttle Area Calculation discusses relating angle to area.

Acquiring Data

Our first objective was to rapidly generate test data versus throttle angle and downstream pressures with which to characterize throttle airflow. We also wanted to minimize the inlet pressure and temperature ranges over which data was taken. To do this, we relied on the simple but known approximate pressure and temperature-scaling relationships already included in the ideal flow functions. These relations adequately describe density and sound velocity variation with pressure and temperature in typical automotive throttle applications. Exhaustively verifying these predictions at other upstream temperatures and pressures far from the original test conditions is outside the scope of this invention.

We seek to describe throttle flow as a function of throttle angle θ, downstream pressure $P_2$, and upstream temperature and pressure $(T_0, P_0)$ for a throttle of conventional design. A direct but time intensive approach to data gathering is to specify an evenly spaced grid of throttle angles and downstream pressures, set these conditions on the flow bench, and exhaustively measure the resulting flow.

The trouble with this approach is that even with an automatic pressure regulation device, sonic flow bench setpoints can't be reached quickly. Devices measuring or controlling small differential pressures are apt to have a long settling time. This considerably lengthens testing. Further, controller or operator intervention inevitably adds noise and setting errors into the data.

We have devised an alternate approach that gave good results, taking advantage of inherent sonic flow bench characteristics (see Appendix Sonic Nozzle Flow Bench). The method takes one of two forms, which can be interchanged to check each other. In the first form, throttle angle is fixed and sonic nozzles are used in combinations to give either increasing or decreasing flow. This first method draws points to outline the constant angle curves shown in FIG. 4. The second form fixes a set of sonic nozzles to set a fixed flow, then sweeps throttle angle. Resulting data from this method are drawn as lines in FIG. 4.

Figure 4:
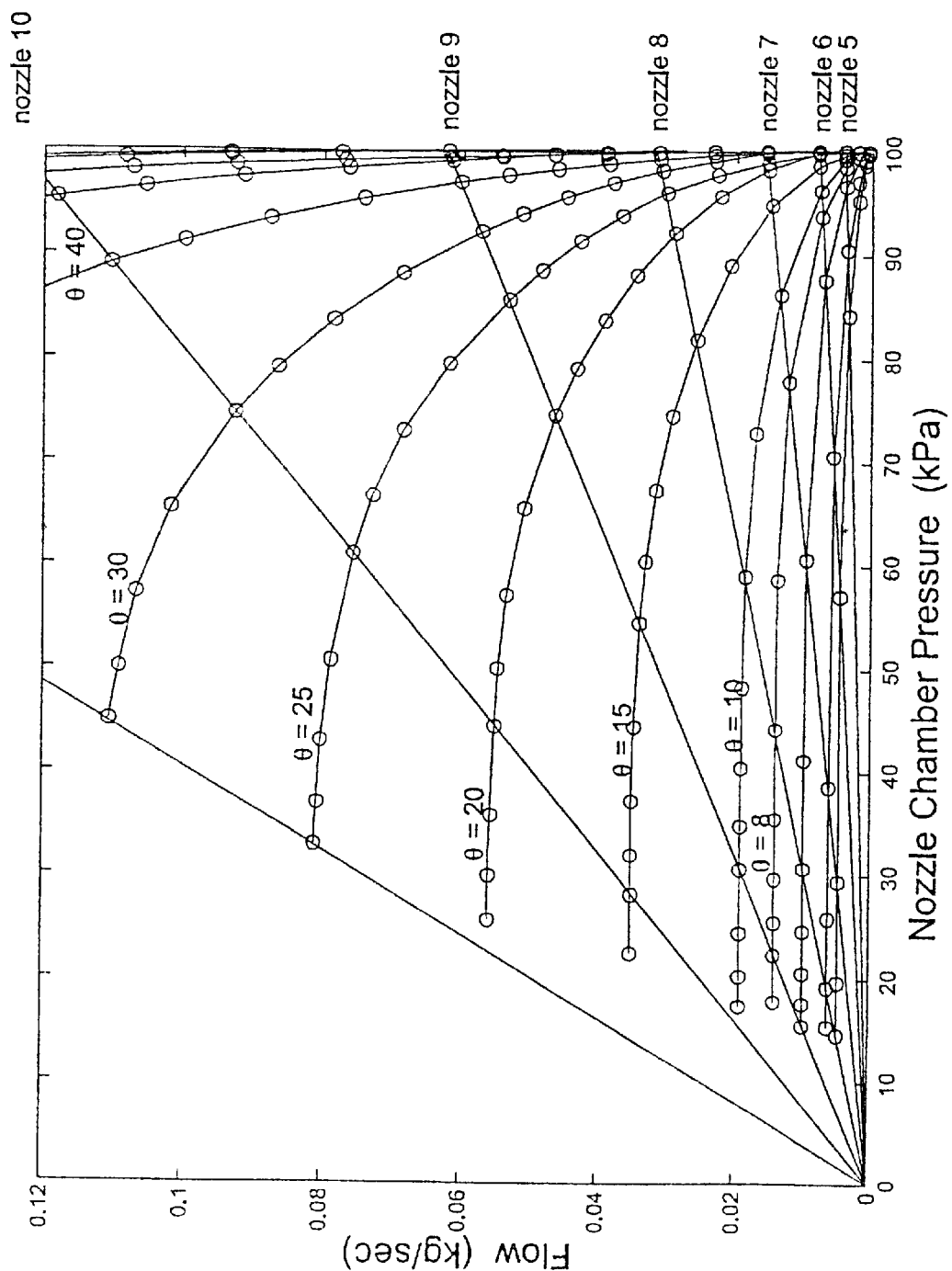
FIG. 4 shows a plot of flow as a function of nozzle chamber pressure for constant angles and nozzle flows.

FIG. 4 shows we can either fix a nozzle and sweep throttle angle (draw almost continuous or data dense lines if we choose), or fix throttle angle and select discrete nozzle combinations (place discrete points on the throttle curves). Not all constant nozzle combination lines are drawn to prevent clutter on the plot, but the interested reader can easily plot other lines starting at the origin and through appropriate points on the throttle curves. The second form of the method allows extremely dense data to be taken with a minimum of intervention and fuss.

The second method draws straight lines through the origin because the chamber upstream of the sonic nozzles (see FIG. 18 and Appendix Sonic Nozzle Flow Bench) is operated such that nozzle throat velocity is sonic.

A throttling process (what throttles do) is assumed to be at constant enthalpy with small or negligible gas kinetic energy. For an ideal gas, this keeps throttle downstream temperature equal to upstream or inlet temperature. This temperature in turn is held constant at the test laboratory ambient. Thus downstream nozzle sonic velocity is almost constant. Nozzle mass flow increases linearly with nozzle upstream density, and hence linearly with upstream nozzle or manifold pressure, satisfying the ideal gas law.

Figure 5:
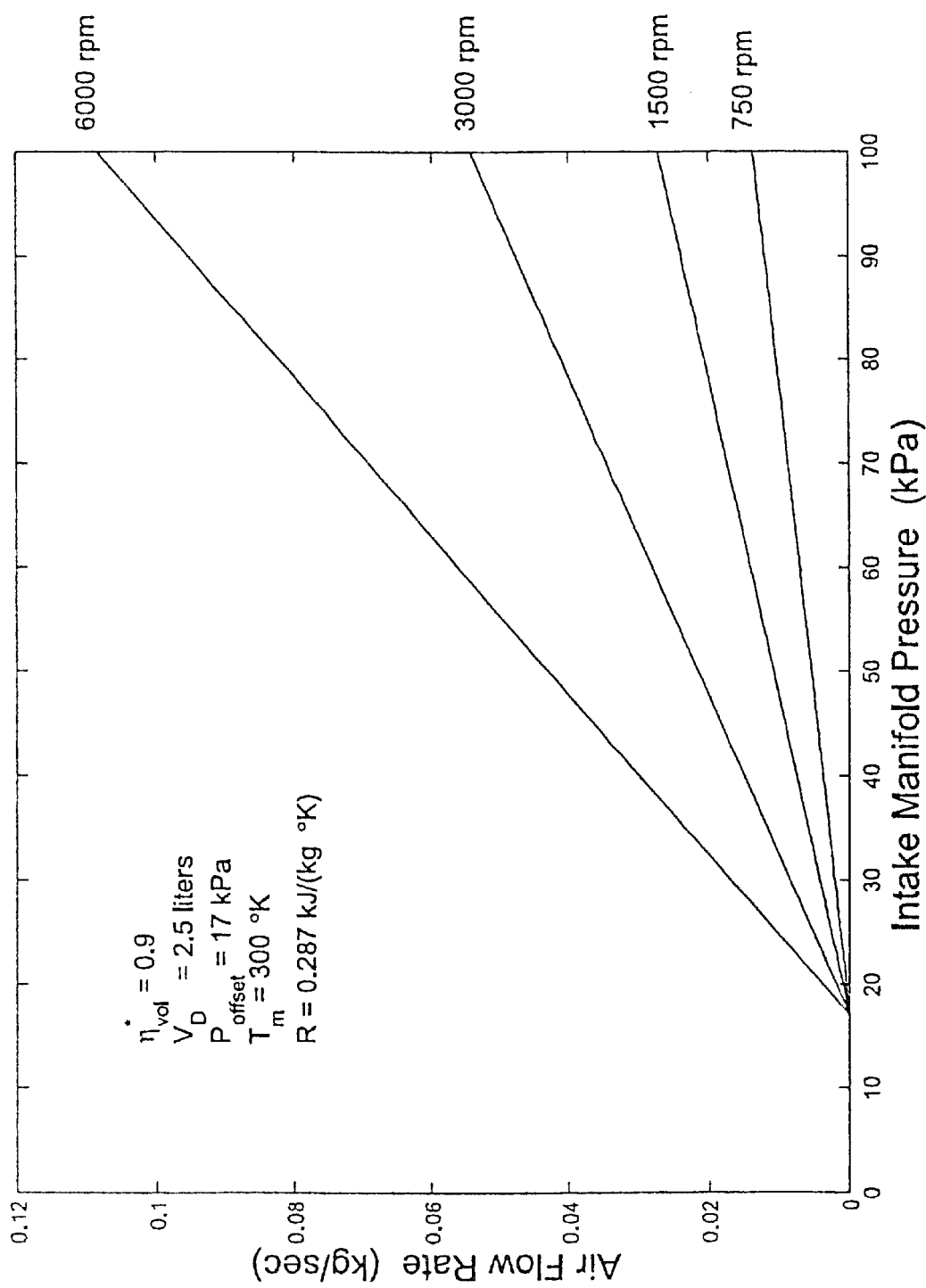
FIG. 5 shows a plot of idealized steady state engine mass flow characteristics for several speeds.

The inventors of the present invention saw these plots and were struck by their similarity to an engine's flow map. This gave the inventors an idea to further simplify the data taking and fitting process. Lines drawn using constant nozzle areas (e.g. nozzle 10, 9, 8, 7) roughly corresponded to constant engine speed mass flow induction lines. FIG. 5 plots idealized but typical steady state engine induction mass flow characteristics for several speeds (6000, 3000, 1500, and 750 rpm) (see Appendix Engine Flow Map).

The sonic flow bench's constant nozzle area lines are linear (intersecting the origin). An engine's constant speed mass induction rate lines are affine (straight lines not intersecting the origin because of residual gas flow).

Engine dynamometers are often operated at constant speed. When mapping throttle flow with an engine, it is typical to set engine speed, then step through throttle angle recording airflow (FIG. 5). This is remarkably similar to the way data was taken on the sonic nozzle flow bench to produce FIG. 4.

Figure 3:
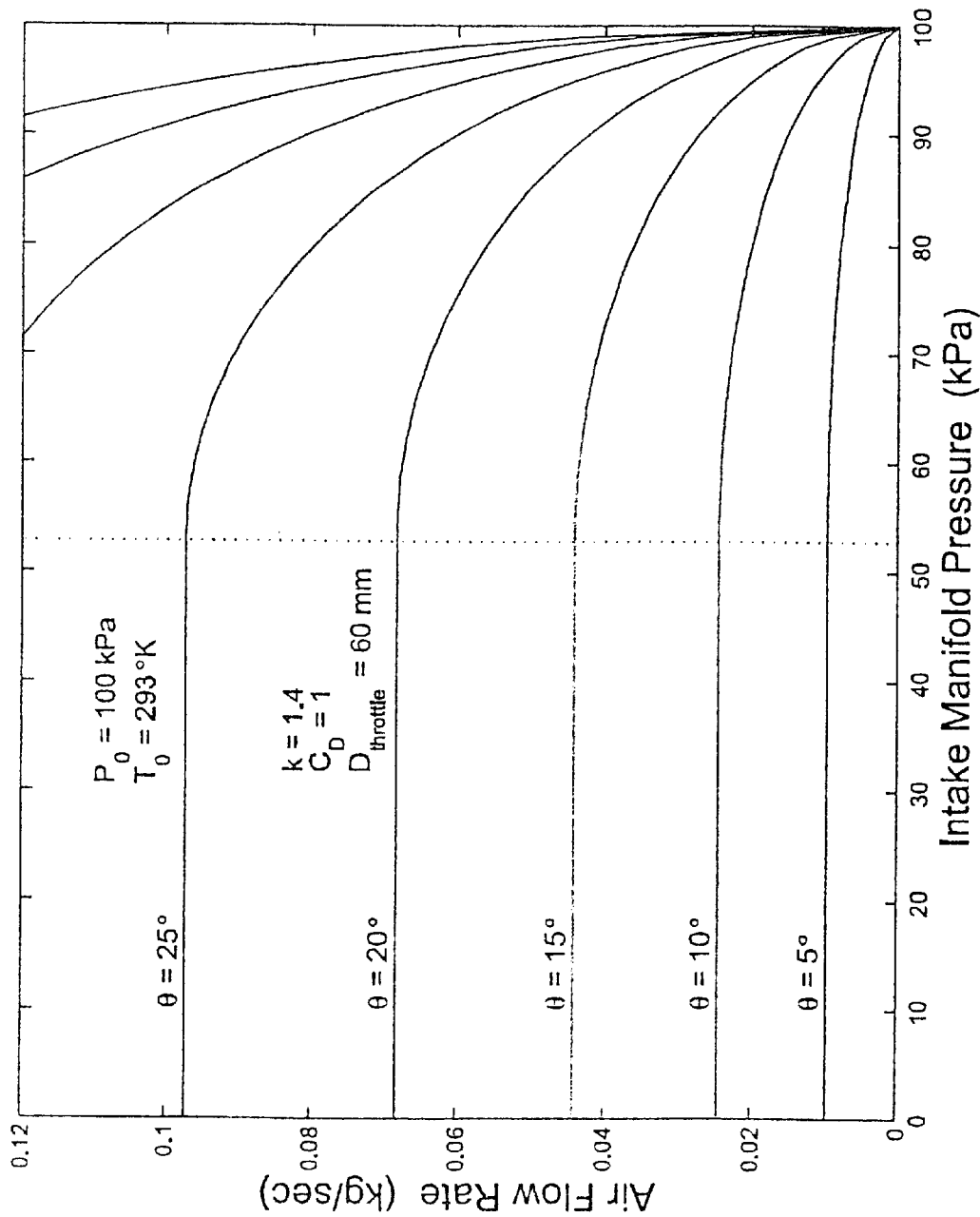
FIG. 3 shows a plot of air flow rate as a function of intake manifold pressure for constant throttle angles.
Figure 6:
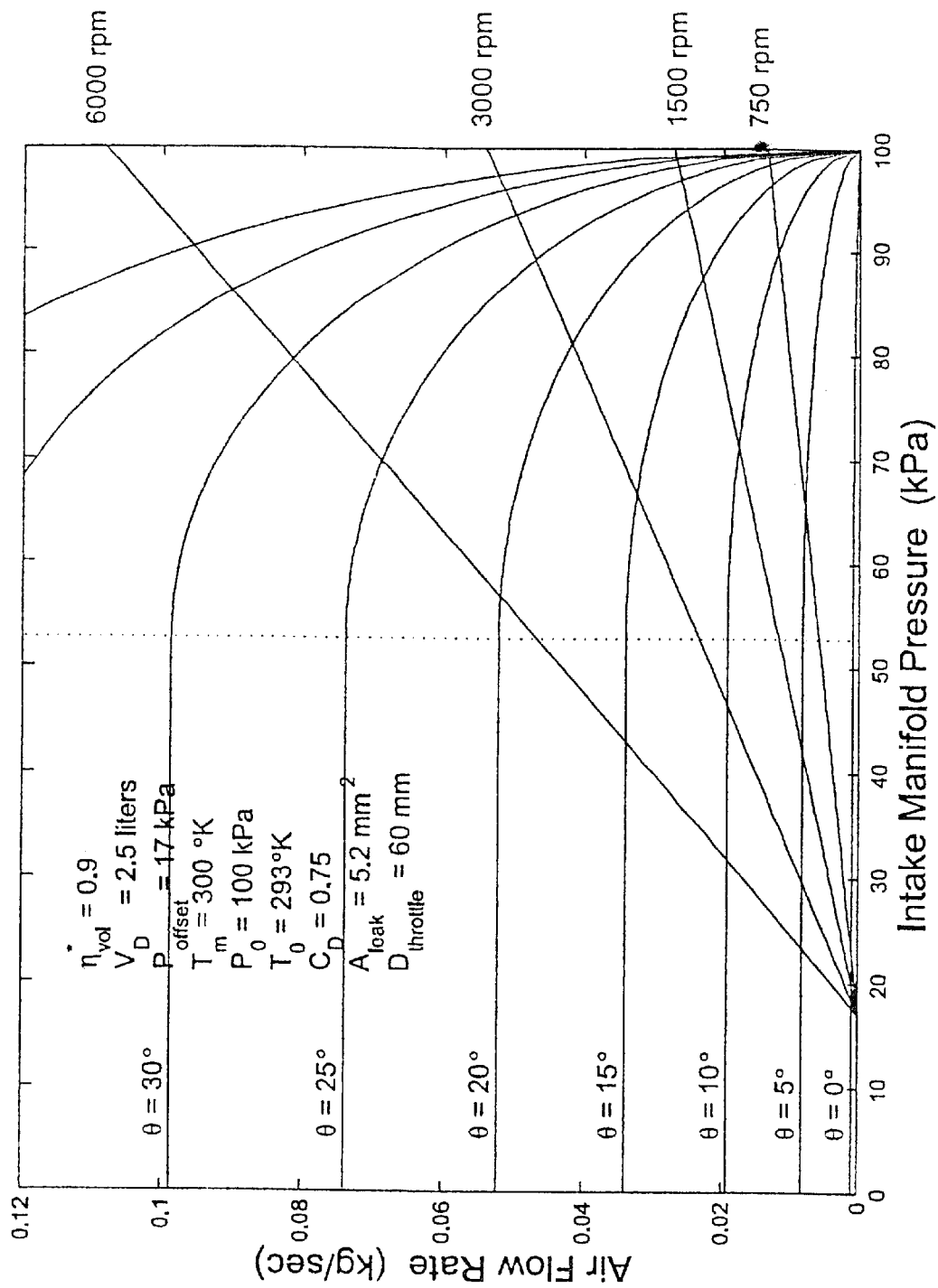
FIG. 6 shows a plot of FIG. 3 superimposed on FIG. 5.

FIG. 6 superimposes FIG. 3 (replotted with a $C_D$=75, $A_{leak}$=5.2 mm$^2$) and FIG. 5. The intersection of a throttle characteristic curve and an engine characteristic line defines a possible steady-state operating point.

FIG. 4 shows both constant throttle angle curves and constant nozzle lines. When we saw the similarity between FIGS. 4 and 6, we realized the next possible simplification would be to restrict throttle angles and nozzle flows to those that more closely match possible engine operating conditions.

Data Region of Interest

A throttle flow estimator only needs high accuracy in the region where it will be used. Data outside this region is of academic interest, but should be given low weighting during fitting or not used at all. Transient throttle airflow estimation may be of significance, but we primarily want steady state airflow accuracy.

Figure 7:
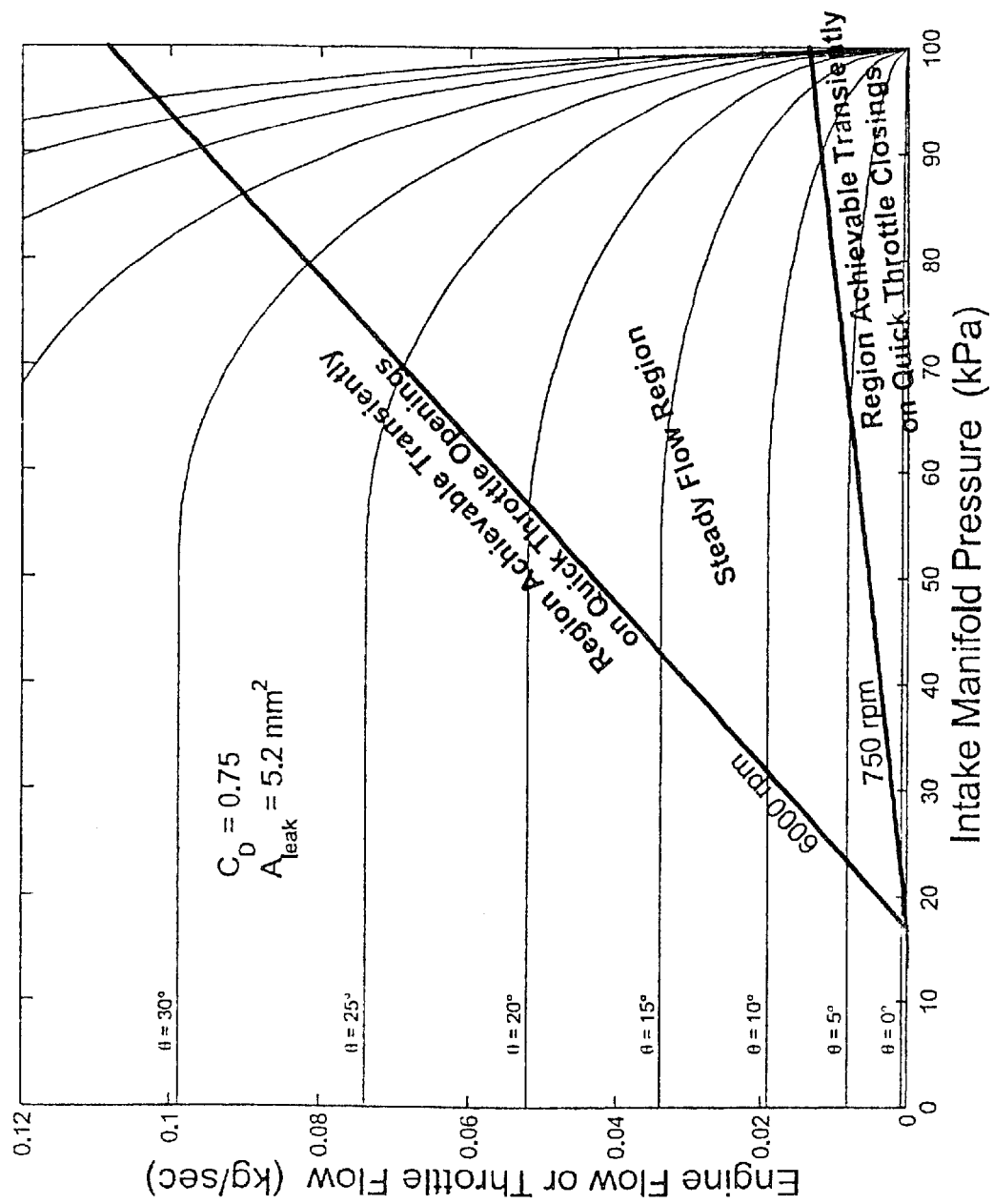
FIG. 7 shows a plot of the flow limits for steady state operation.

If an engine operates between 750 and 6000 rpm, we are primarily concerned with throttle flows that can be steadily maintained in that speed region. In FIG. 7, the lines define normal upper and lower engine speed limits on steady flow.

Sudden throttle angle increases may cause momentary flows above the 6000 rpm line while the manifold fills. Similarly, sudden angle decrease will cause flows momentarily below the 750 rpm line while the manifold is evacuated.

Engines often operate at negative brake torque, but this is not a primary use region. An engine's negative brake torque region's border is well approximated by a constant low intake manifold pressure, shown as the left vertical line in FIG. 8. Flow data in this negative torque region can be lightly weighted or perhaps disregarded during fitting.

Because engine emissions are extremely sensitive to fuel-air ratio, we are usually concerned about the fractional error of an estimate, not absolute error (percent of value versus percent of full scale). In most (but not all) engine airflow accuracy and sensitivity analyses, specifications are stated in terms of maintaining accuracy to a percent of value. Sometimes this information is translated into another specification form ("maintain a 750 rpm idle±10 rpm"), but changing from a known fractional sensitivity to this alternate form is straightforward.

Sensitivity in an engineered system is defined as the fractional variation of a controlled or estimated quantity divided by the fractional variation of the controlling quantity. Defining the throttle flow estimate sensitivity to either MAP or manifold vacuum fractional uncertainty, we have:

$$\text{flow estimation pressure sensitivity} \equiv \frac{\frac{\delta flow}{flow}}{\frac{\delta pressure}{pressure}} \quad (6)$$

$$\equiv \frac{pressure}{flow} \frac{\delta flow}{\delta pressure}$$

$$\text{flow estimation vacuum sensitivity} \equiv \frac{\frac{\delta flow}{flow}}{\frac{\delta vacuum}{vacuum}} \quad (7)$$

$$\equiv \frac{vacuum}{flow} \frac{\delta flow}{\delta vacuum}$$

Figure 8:
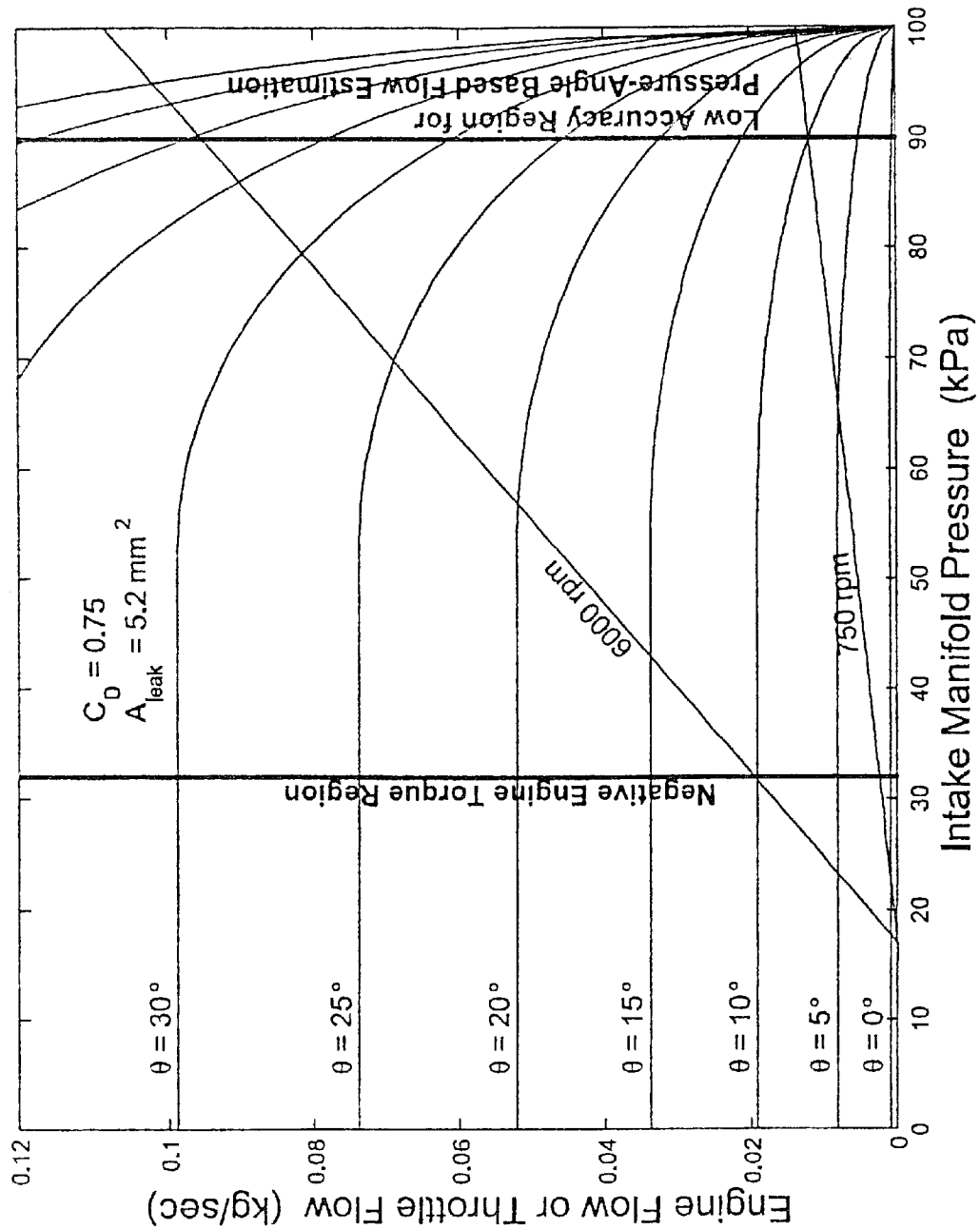
FIG. 8 shows a plot of the flow limits for negative torque and pressure-angle based estimation accuracy.

Examining flow versus pressure curves in FIG. 8, we see that flow doesn't change with pressure or vacuum in the sonic region (pressure ratio less than 0.5283). Because for the ideal flow laws flow doesn't change with either pressure or vacuum, in this region the derivatives used to evaluate either Equation (6) or (7) are zero, so flow sensitivity in this region is necessarily zero.

In the subsonic region near pressure ratio 1, the flow derivative magnitude with either pressure or vacuum is large. Because pressure in this region is necessarily larger than vacuum, equal fractional (gain errors) on the transducers produce the interesting result (stated without proof) that if the estimators have equal knowledge of upstream pressure, the estimator based on vacuum has lower fractional sensitivity than the estimator based on manifold pressure. Sensitivity to an offset in the measurement is higher for the vacuum-based estimator.

For either estimator (pressure or vacuum) we can thus draw a boundary beyond which pressure or vacuum measurement uncertainty multiplied by $$\frac{\delta flow}{\delta pressure}$$

makes a throttle airflow estimate of little value. For illustration purposes, we arbitrarily chose a pressure of 90 kPa (vacuum of 10 kPa) to draw a vertical line that defines an upper pressure sensitivity limit (FIG. 8). At this point, a ±1% error in pressure measurement produces roughly ±4% flow estimation error. This upper pressure sensitivity limit defines the right side of what we will now define as the Primary Use Region.

Figure 9:
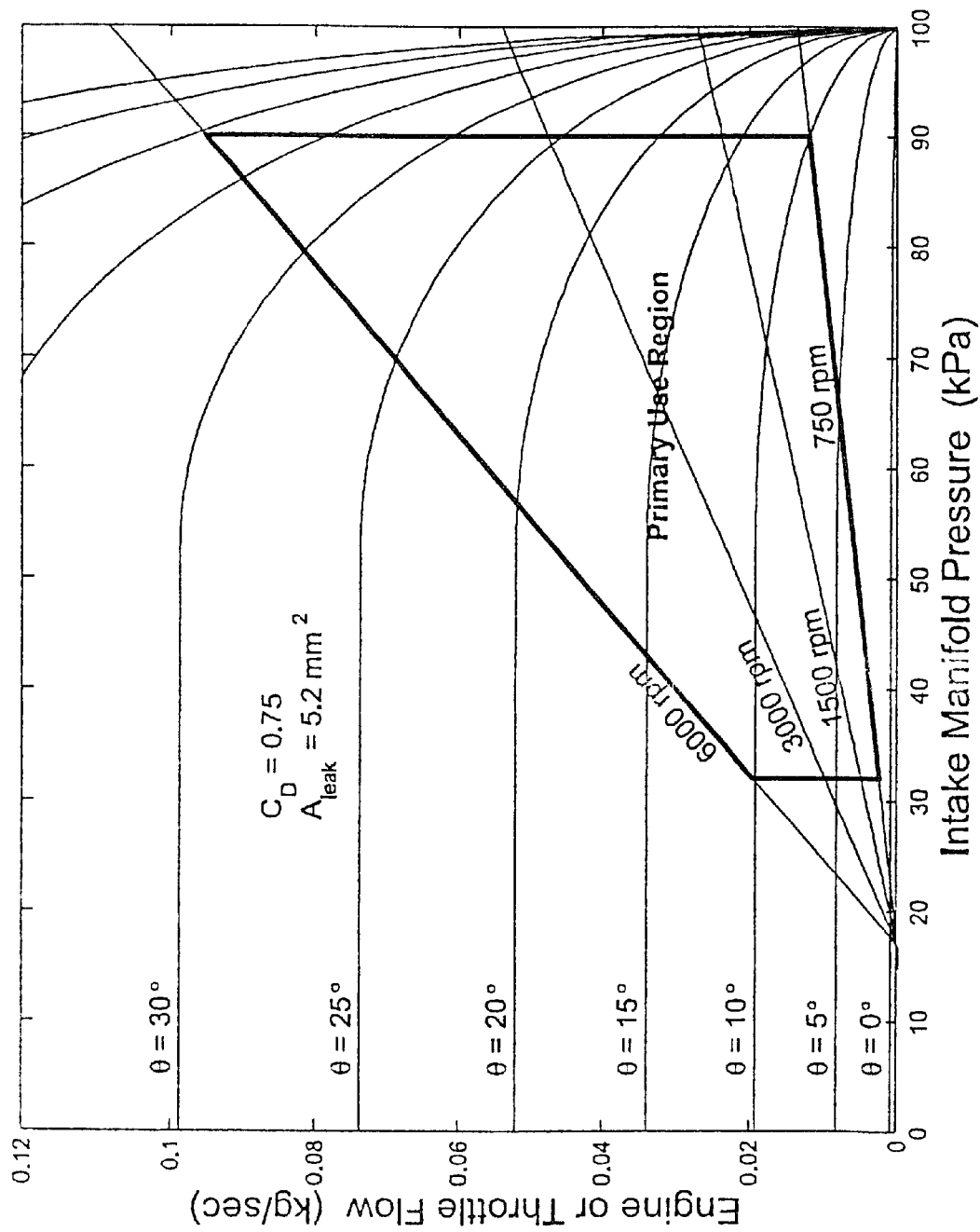
FIG. 9 shows a plot of the primary use regions formed by the engine upper and lower speed limits, negative torque limit, and flow pressure sensitivity limit.

The engine upper and lower speed limits, negative torque limit, and flow pressure sensitivity limit form a quadrilateral in FIG. 9. However, most steady flow bench data is outside this region. As an example, we can disregard sonic flow points above 20° and subsonic points below 4° because they are not achievable in steady engine operation. Whether data taken in this region would dominate engine transient intake flow is a matter of conjecture, as it disregards all other induction system transient responses. Given the shape of this quadrilateral, we can concentrate our attention on pressure ratios between about 0.32 and 0.9 which are within the primary use region.

Fitting a Flow Estimation Function

Even though we take data by setting throttle angle and intend to use a fitted function of throttle angle, it makes sense to first consider the potentially more instructive method of fitting data to throttle area instead of throttle angle for two reasons. First, we would have to capture the added curvature of the angle to area function shown in FIG. 15. Second, such a model masks the significance of leak area.

Figure 17:
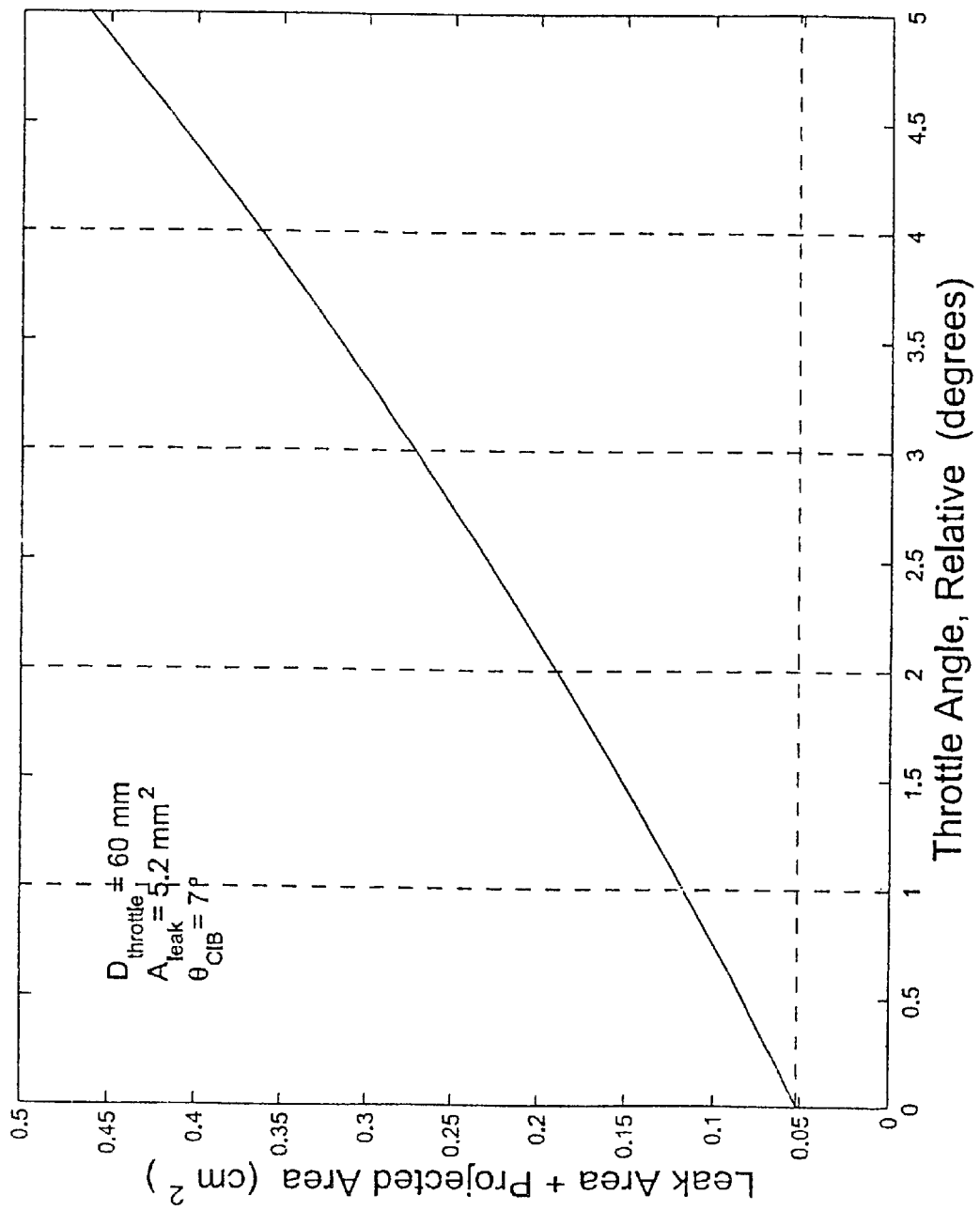
FIG. 17 is a plot of leak area plus projected area as a function of relative throttle angle.

At closed throttle, conventional area models that don't include a leak predict zero flow area, thus the erroneous conclusion of zero flow at closed throttle. At small throttle angles, area variation versus throttle angle can't be adequately captured unless we include leak area. Flow at small angles is dominated by leak area, but the leak area effect decreases quite rapidly. This is shown in FIG. 17 in Appendix Throttle Area Calculation. Neglecting this can lead an inexperienced applications engineer to over-specify angle resolution and under-specify total allowed leak area variation.

To compute throttle area, throttle main bore area was first computed using a conventional area calculation formula shown in Appendix Throttle Area Calculation. Leak flow area was then computed from zero angle data and added to the calculated main bore area.

As just stated, a simple and likely inexact throttle area model was produced including both main bore and leak areas. Although inexact, it is adequate for throttle flow estimator characterization. This was done for two purposes: first, to examine variation of actual discharge coefficient $C_D$ with angle; and to examine normalized flow versus pressure curve shapes to see if the determination of throttle flow using Equations (2) and (5) were adequate.

Figure 10:
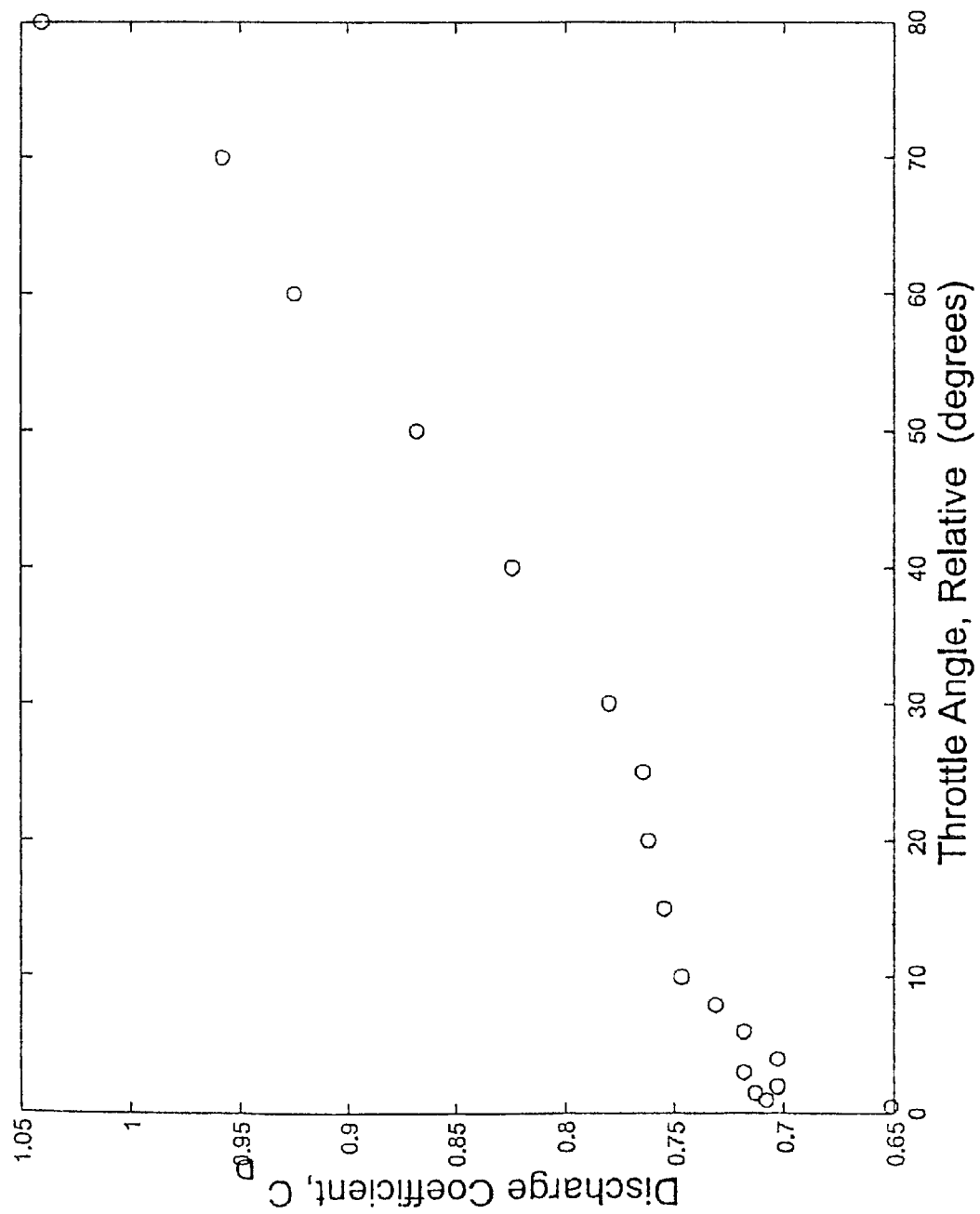
FIG. 10 shows a plot of the discharge coefficient CD as a function of relative throttle angle.

FIG. 10 plots these nominal $C_D$ values and suggests that a possible implementation method is to estimate $C_D$ as an affine function of throttle angle varying from 0.65 to 1.05. However, a significant hidden risk exists to a simple-minded use of the $C_D$ data of FIG. 10 in Appendix Throttle Area Calculation at small throttle angles. As seen in FIG. 10, small throttle angle $C_D$ data is extremely sensitive to estimated leak area. Further, effective leak area can vary significantly during manufacture and tends to decrease with use due to deposits. Main bore throttle flow area is smallest at small angles so leak area's effect is largest there (0° to 2°). Because there is usually a slight leak, observed flow is larger than flow predicted of leak area is assumed to be zero. To model main bore flow adequately, we first added leak area to the estimated leak area until the adjusted estimated leak is approximately equal to the measured leak area.

Conventional methods, such as the type described in U.S. Pat. No. 5,464,000, adjust for the amount of fuel delivered to an internal combustion engine as a function of throttle angle by fitting an affine function (not through the origin) to a linear function (through the origin) with a scale factor. The entire disclosure of U.S. Pat. No. 5,464,000 is herein incorporated by reference. Although adequate for its intended purpose, this conventional method can be problematic for two reasons. First one unpredictable swings in the scale factor to accommodate small offsets that are likely to change in use. Second, linearly interpolating a scale factor to adjust a linear function for what is actually an affine function gives an estimation curve with a series of parabolic scallops, not a smooth curve that one intuitively expects.

Figure 11:
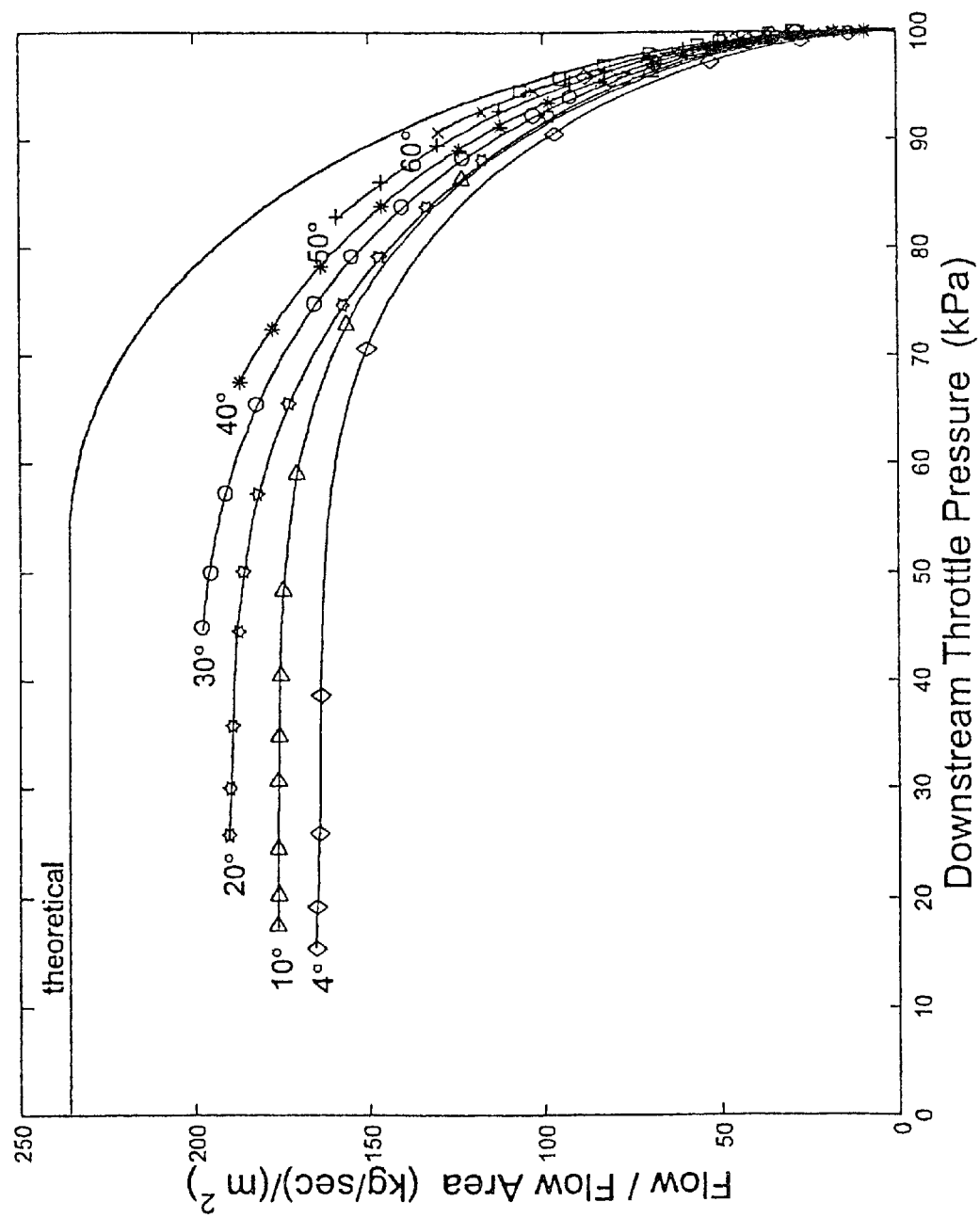
FIG. 11 shows a plot of observed flow variation with pressure compared to theoretical.

To emphasize the difference between actual data and theoretical prediction, we re-plotted the data of FIG. 10 or multiple angles on a common scale versus downstream pressure. FIG. 11 shows observed flow variation with pressure compared to theoretical. The normalized area free ideal flow Equations (2) and (5) are the upper solid curve. The magnitude ratios are the $C_D$ scale factors already discussed. Clearly, experiment approaches theory as throttle angle increases, and we have already stated that an estimator could be made using a $C_D$ correction factor as a monotone function of throttle angle.

But the curves also indicate that flow does not "choke" at all angles at a single value of pressure ratio, and that blindly applying theoretical functions without attention to a primary use region or $C_D$ adjustment would give erroneous results. In particular, theoretical prediction of controller structures or control process must be based on physical reality and examination of data.

Concluding summary comments about the data are given in increasing throttle angle order.

Small Angle Data

For angles from 0.5° to 1.5° in the subsonic region, agreement between the subsonic Equation (2) and actual data is poor. For the smallest angles tested (0.0° and 0.5°), as the ratio of projected main bore throttle area to the summed perimeters of throttle plate and becomes smaller, flow is increasingly dominated by viscous forces. This viscous behavior likely always represents the leak area, which is increasingly significant at small angles. Flow versus pressure curves in this regime resemble a laminar flow element (LFE) characteristic for low pressures ($\dot{m}\ \Delta P^n$), and for low differential pressures we could expect flow behavior to resemble an LFE or a device in which viscosity effects are significant.

Subsonic flow for small angles is irrelevant.

Given our 2.5 liter engine and 60 mm throttle combination, the system can't operate at steady speed for throttle angles below 3°.

We get good data fits for small angles if we only consider the sonic region. The theoretical curve shape cannot be scaled to fit both sonic and subsonic regions. Actual throttle data doesn't become constant at the theoretically predicted sonic pressure ratio $$\left(\text{when computed as } \frac{P_2}{P_0}\right).$$

Intermediate Angle Data

At angles above 20° a fit to the sonic regime is almost irrelevant for this engine-throttle combination. This might not be the case for a smaller throttle or larger displacement engine.

At angles from 20° to 30° flow rate continues to rise as pressure ratio drops below the theoretical sonic value. This is significantly different from the simple theory's prediction. But here again, we are computing pressure ratio as $$\frac{P_2}{P_0}$$

and not $$\frac{P_1}{P_0}$$

as the theory would require.

Large Angle Data

Agreement for angles from 40° to 80° is excellent. This is partly true because of insufficient data in the sonic region to test the theoretical equations' shape. Data for large angles is reasonably well described by simple functions resembling ($\dot{m}\ ^{\vee}\ \overline{\Delta P}$). While data can be well fit, a pressure-angle estimator above about 60° is of limited utility because of estimated flow's extreme sensitivity to pressure measurement error in that region.

Summarizing these observations, the throttle studied only approximates a sharp edged orifice (Equations (2) and (5). At small angles, data resembled a viscous flow characteristic ($\dot{m} \Delta P^n$). We note the lack of a well-defined "choking" point. An orifice model was adequate at intermediate angles by proper selection of the application region. At large angles, there was insufficient data to determine whether an orifice or venturi characteristic applied. But the requirement for low throttle loss at high flows makes the point moot, because few designers will place a throttle onto an engine that will choke the flow at 60° throttle angle.

Based on these observations, simply scaling the theoretical equations over the entire data region gives poor performance. But scaled theoretical equations can give a reasonable fit to data in a properly selected steady operation region of interest.

Looking initially only at data for angles from 3° to 15°, we might have concluded that the data correlates well with the theory and reached a prematurely early and erroneous conclusion to our fitting study. Drawing such early conclusions depends strongly on how engine and throttle are combined.

The particular engine and throttle system that was studied had a displacement to throttle bore area ratio of $$\frac{\text{engine displacement}}{\text{throttle bore area}} = \frac{2.5 \text{ liters}}{(60 \text{ mm}/2)^2 \pi} = 0.884 \text{ meters} \quad (8)$$

This length is the distance that incompressible flow would travel along a throttle-sized tube every two engine revolutions. Higher values indicate higher velocities and flow losses. The ratio for engine throttle combination studied is on the low end of the range observed in use (0.8 to 2 meters), indicating a reasonably large low loss throttle.

If the throttle were smaller, say 50 mm, the matching parameter would be $$\frac{\text{engine displacement}}{\text{throttle bore area}} = \frac{2.5 \text{ liters}}{(50 \text{ mm}/2)^2 \pi} = 1.273 \text{ meters} \quad (9)$$

Flow velocities would be 50% higher, dynamic pressures would double, and our conclusions about how best to build a flow estimation process might need to be revisited. We would, however, have an organized approach with which to examine the data and reach our conclusions as follows:

Measuring throttle airflow on a sonic nozzle flow bench by stepping throttle angle for fixed nozzle selections is a more efficient data collection method than the alternate of setting both throttle angle and pressure drop. It eliminates setting errors and delays compared to the alternate of setting pressures by opening and closing nozzles. For our data, what used to take 20 hours took only 6 hours.

Throttle airflow estimators should be fit to data in the engine airflow range, not the entire flow bench mapping range.

Correct interpretation and application of sonic nozzle flow bench data can be used to construct a throttle flow estimator of reasonable accuracy based on a simple theoretical model. Judiciously "ignoring" irrelevant data based on the particular engine application is key.

It is critical to add a leak area estimate to projected throttle areas to make comparison of actual and theoretical flows reasonable for small throttle angles; such as might be used for idle speed control. If leak area is ignored, the relation can't be resolved with a single $C_D$ scale factor.

A simplified throttle projected area calculation is adequate for throttle characterization since in a simple model one can't precisely separate effects in the $C_D A$ product.

Fitting data by adjusting $C_D$ as a function of throttle angle is generally effective. The resultant $C_D$ is a well-behaved function of θ that can be represented by either a function or look up table.

We need only model small angle performance below sonic pressure ratio because that is where the engine/throttle system operates.

For the engine-throttle combination under study, an estimator based on fitting data to a simple but general flow function scaled with a discharge coefficient $C_D$ is effective for all pressure ratios for throttle angles from 3° to 15°, and for subsonic pressure ratios for angles greater than 15°.

Estimating airflow based on MAP and throttle angle is likely to result in large variation because of the estimation method's large sensitivity to MAP.

Actual throttle or orifice flows often do not saturate or "choke" at the sonic pressure ratio of 0.528.

Figure 12:
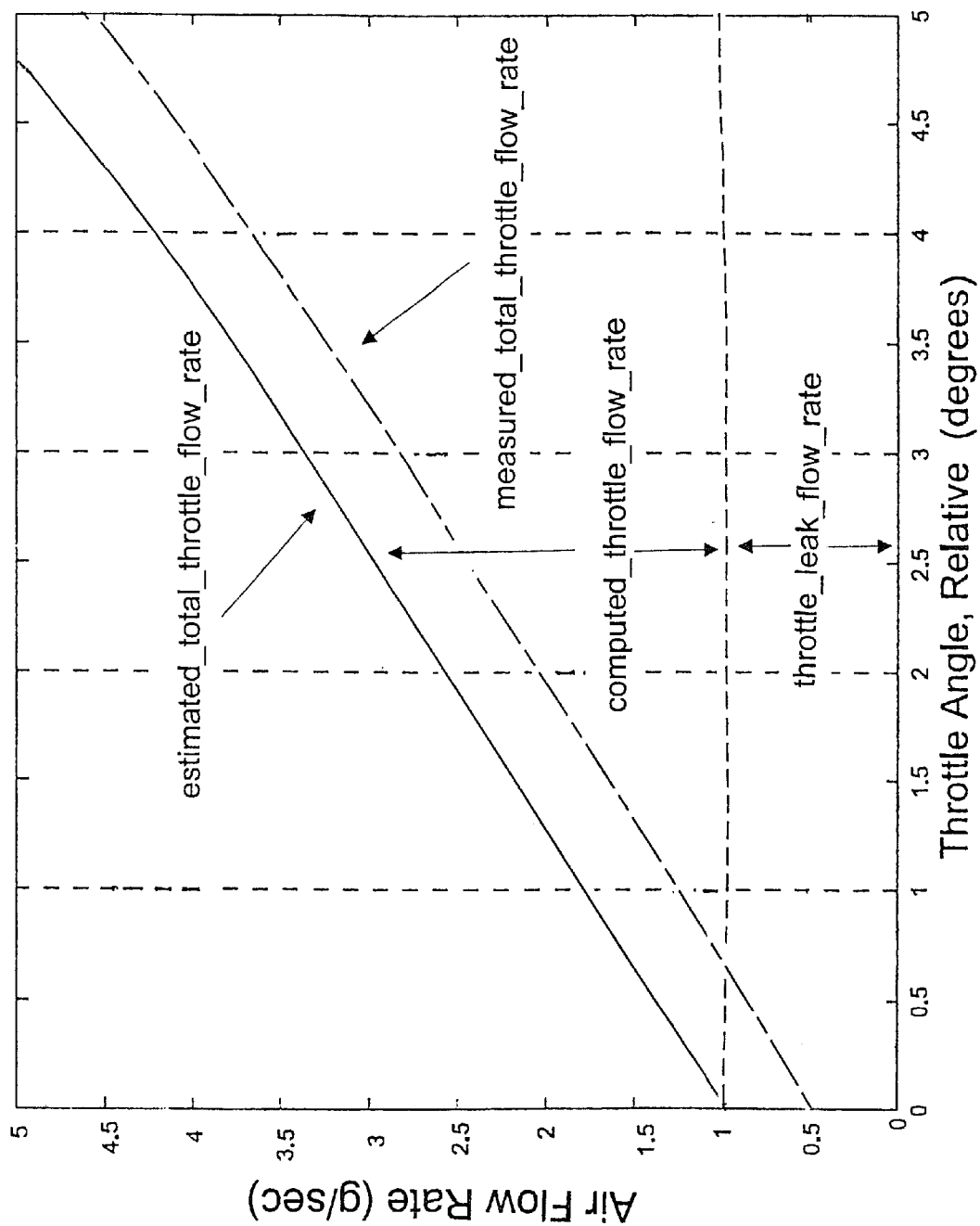
FIG. 12 shows a plot of measured and predicted airflow rate as a function of throttle illustrating that the difference between estimated and measured airflow rate is constant.

The present method of the invention virtually eliminates problems in throttle-based airflow estimates for small throttle angles due to manufacturing variation and deposit formation. Specifically, the estimated leak flow is adapted to the measured or actual leak flow by recognizing that the airflow characterization for delta airflow is extremely consistent over both manufacturing variation and deposit formation, as shown in FIG. 12.

The measured or actual airflow is available from the vehicle's on-board computer (PCM) for steady state conditions. By steady state, we mean that airflow into the intake manifold is within 5% of the airflow exiting the intake manifold into the engine. Measured or actual airflow rate ($\dot{m}_{air}$) can be determined from any one of the computations: 1) fuel rate/fuel-air ratio, 2) fuel rate/stoichiometric fuel air ratio when operating at stoichiometry, and 3) the mass airflow meter. For 1) and 2) above, the fuel rate can be determined when only the injectors are supplying fuel when the canister purge is turned off.

The estimated airflow rate $\dot{m}_{air\ estimate}$ can be determined as a function of: 1) throttle position, 2) throttle position and manifold pressure, or 3) throttle position and engine speed. The throttle area is the sum of the throttle area as a function of throttle angle and the leak area. Analogously, throttle flow is the sum of leak flow and throttle flow as a function of throttle angle. The coefficient of discharge $C_D$ can be computed as a function of throttle angle (FIG. 10). An initial computation of leak flow area $A_{leak}$ and throttle area can be computed using Equation (25) in Appendix Throttle Area Calculation. Throttle area can be computed by first computing throttle main bore area using a conventional area calculation formula. Leak flow area $A_{leak}$ can be computed from zero angle data and added to the calculated main bore area.

Figure 13:
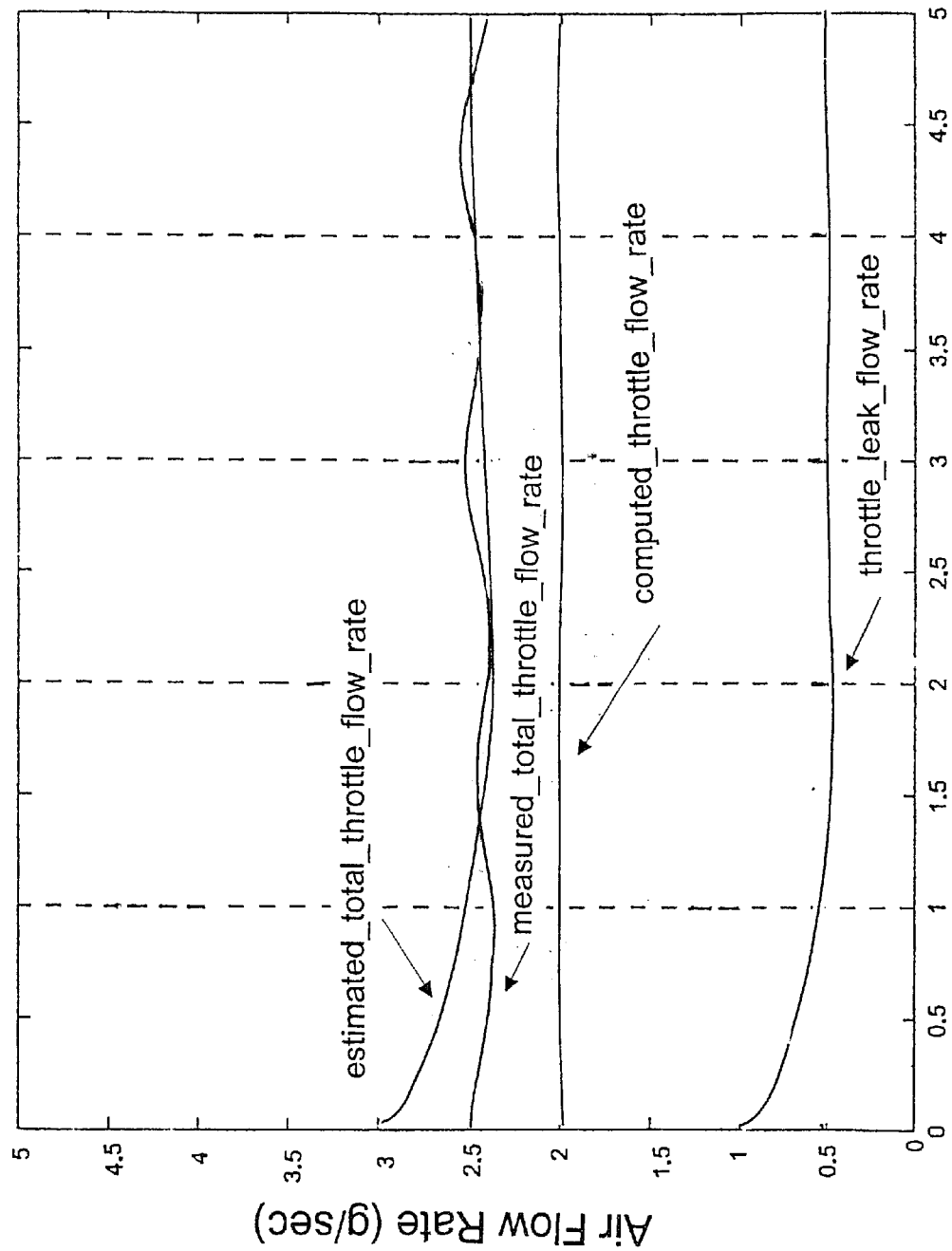
FIG. 13 shows a plot of estimated and measured total throttle airflow rate as a function of time illustrating that the offset or addend drives the error between the estimated and measured airflow rates to zero.

The inventors have recognized that the one reason why the estimated or predicted airflow from throttle angle disagrees with the measured airflow is that the computation of leak flow area $A_{leak}$ is incorrect. Accordingly, the method of the invention provides an adaptive learning process that adjusts the computation of leak flow area $A_{leak}$ by utilizing an addend or offset in a low pass filtering technique to account for the throttle flow rate at closed throttle (i.e., relative throttle angle is zero). The addend or offset adjusts the leak flow area $A_{leak}$ such that the estimated airflow rate eventually equals the actual or measured airflow rate. The addend or offset can be expressed as:

$$A_{leak_k} = \alpha A_{leak_{k-1}} + (1-\alpha)(\dot{m}_{air\ estimate} - \dot{m}_{air}), \quad (10)$$

where $\alpha$ is a constant between 0 and 1. The addend or offset can be a constant value (scalar) that will eventually cause the average error between the actual (measured) and predicted (estimated) throttle leak flow rate to converge to zero even if the throttle angle varies as a function of time, as shown in FIG. 13. Alternatively, the addend or offset can be look-up table of a type well-known in the art, such as a type described in U.S. Pat. No. 5,464,000, for one or more throttle angles. The adaptive learning method of the invention can occur during steady state operation and then can be available for use during transient operation.

Figure 14:
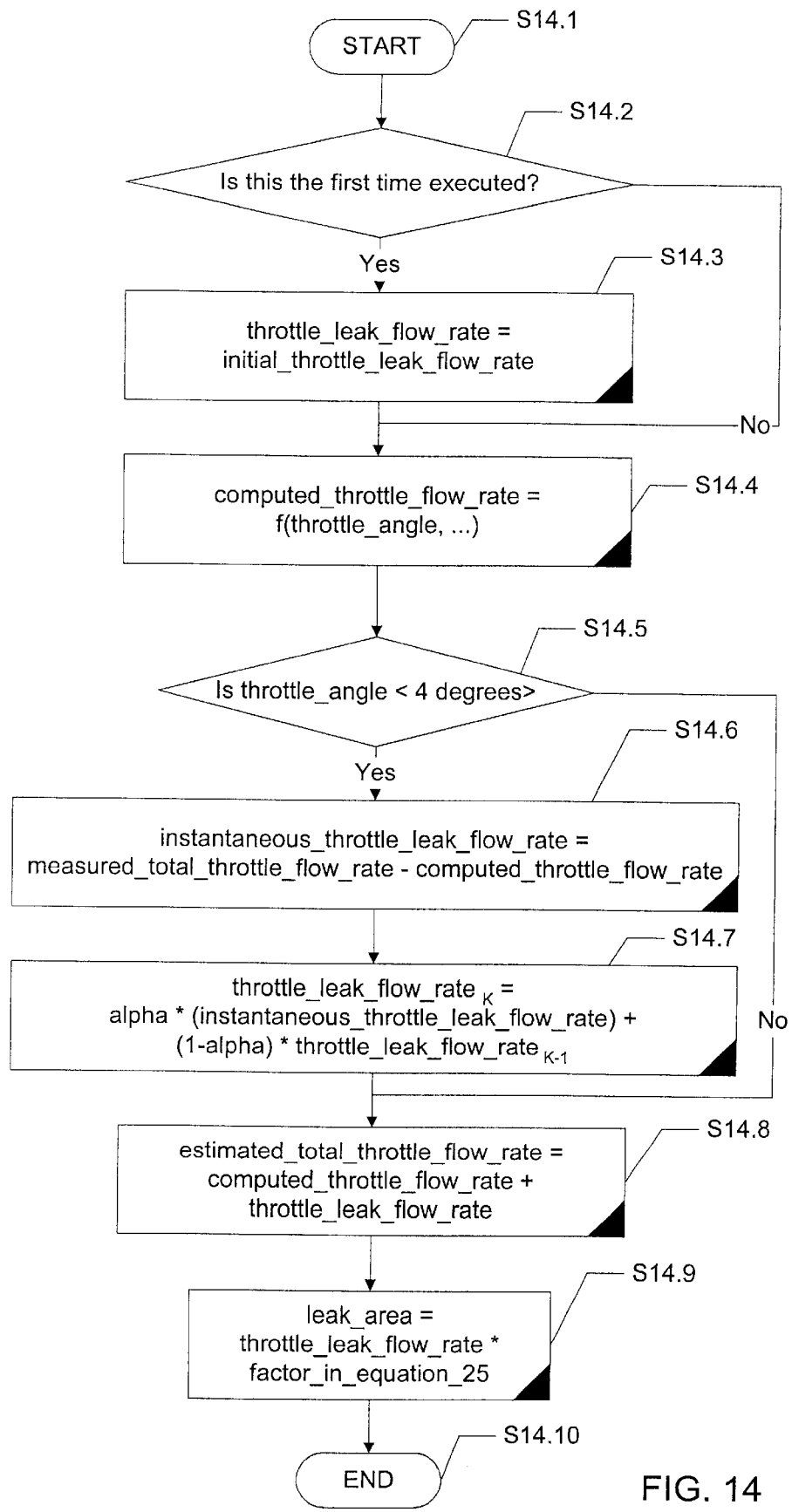
FIG. 14 shows a flowchart illustrating the method of the invention of adjusting the throttle leak flow rate at small throttle angles by using a low pass filtering technique.

Referring now to FIGS. 13 and 14, the method of the invention for adaptively learning and correcting the throttle leak flow rate will now be described. The process begins at Step S14.1. Then, the PCM determines whether this is the first pass through the process (Step S14.2). If so, then the process proceeds to Step S14.3. If not, then the process proceeds to Step S14.4. In Step S14.3, the PCM estimates the throttle air flow rate at closed throttle by using the following expression:

throttle_leak_flow_rate=initial_throttle_leak_flow_rate

In Step S14.4, the PCM computes the throttle flow rate from the throttle angle and other variables with the construct that the flow rate is zero when the throttle is closed (i.e., relative throttle angle is zero) by using the following expression:

computed_throttle_flow_rate=f(throttle_angle, . . . )

Then, the PCM determines whether the throttle angle as measured by a throttle position sensor is less than four degrees (Step S14.5). If not, then the method proceeds to Step S14.8. If the throttle angle is less than four degrees, then the PCM computes instantaneous throttle leak flow rate in Step S14.6 by using the following expression:

instantaneous_throttle_leak_flow rate=measured_total_throttle_flow_rate−computed_throttle_flow_rate, where the measured_total_throttle_flow_rate is the measured or inferred airflow rate.

Next, the PCM determines the throttle airflow rate at closed throttle in Step S14.7 by using the following expression:

throttle_leak_flow_rate$_{(K)}$=alpha*(instantaneous_throttle_leak_flow_rate)+(1-alpha)*throttle_leak_flow_rate$_{(K-1)}$ (11)

where alpha is a constant between 0 and 1. As stated earlier, the addend or offset can be a constant value (scalar) for adapting the leak flow for a single throttle angle at steady state conditions. Alternatively, the addend or offset can be look-up table of a type well-known in the art, such as a type described in U.S. Pat. No. 5,464,000, for one or more throttle angles.

Then, the PCM determines the estimated throttle airflow rate in Step S14.8 by using the following expression:

estimated_total_throttle_flow_rate=computed_throttle_flow_rate+throttle_leak_flow_rate At this point, the throttle leak flow rate can be used by the PCM. Alternatively, the PCM may convert the throttle leak flow rate to a leak area in Step S14.9 by using the following expression:

leak_area=throttle_leak_flow_rate*factor_in_equation_25 where factor_in_equation_25 is the multiplier to mass airflow rate on the right-hand side of Equation (25) in Appendix Throttle Area Calculation. Then, the process ends at Step S14.10.

The above method describes an adaptive learning process for the addend or offset of the estimated throttle airflow rate or leak area for closed throttle (i.e., near zero throttle airflow). Because the throttle airflow with respect to throttle angle contains no significant dynamics (resulting in transient measurement error), the estimated throttle airflow rate is preferred to the measured airflow rate. Inferences of airflow rate can contain even worse transient errors. Further, the determination of air leak is crucial for choosing a commanded throttle angle to achieve the desired target airflow rate as computed by the engine controller (PCM). Using the above adaptive learning method of the invention, the engine controller (PCM) can determine the throttle flow characterization that is accurate even under changes of throttle leak area. With this adaptive leaning method, the throttle flow characterization's fractional accuracy (i.e., percent of value) is excellent, even at low throttle angles.

While the invention has been specifically described in connection with certain specific embodiments thereof, it is to be understood that this is by way of illustration and not of limitation, and the scope of the appended claims should be construed as broadly as the prior art will permit.

Appendix: Sonic Nozzle Flow Bench

Throttle flow characterization data is usually acquired in a steady flow laboratory environment. FIG. 18 is a sonic nozzle flow bench schematic. The throttle is mounted using a vacuum tight seal to the flow bench. Any devices either upstream or downstream of the throttle that might alter the flow characteristic can also be included in series with it. In the data presented here, we mounted the throttle without any other inlet system components. A pump creates a vacuum downstream of the nozzles. The flow configuration is designed so that any pump pulsations aren't significant at the unit under test or the sonic nozzle flow measurement device. This differs significantly from the engine environment.

Flow measurement can be made by various devices: hot wire anemometry, laminar flow element, subsonic nozzles, sonic nozzles, or the like. We chose to use sonic nozzles because of their repeatability and insensitivity to downstream pressure.

Eleven nozzles can be selectively opened. Nozzle upstream pressure $P_3$ and temperature $T_3$ are measured. Flow for each open nozzle $\dot{m}_i$ is computed with a variant of Equation (5).

$$\dot{m}_i = C_D A_{nozzle_i} \sqrt{kRT_3} \frac{P_3}{RT_3} \phi_1^* \quad (12)$$

Total flow is computed by summing over the selected nozzles. Nozzle areas used are given in Table 1.

TABLE 1

Sonic Nozzle Areas

| nozzle | diameter (mm) | area (mm$^2$) |
|---|---|---|
| 1 | 1.1684 | 1.0722 |
| 2 | 1.6510 | 2.1408 |
| 3 | 2.3317 | 4.2701 |
| 4 | 3.2969 | 8.5370 |
| 5 | 4.6482 | 16.969 |
| 6 | 6.5507 | 33.702 |
| 7 | 9.2431 | 67.100 |
| 8 | 13.0480 | 133.71 |
| 9 | 18.4125 | 266.26 |
| 10 | 25.9921 | 530.61 |
| 11 | 36.8605 | 1067.1 |

In sequence, each nozzle doubles the previous nozzle's area. This allows a binary coded selection of $2^{11}-1$ approximately equally spaced open nozzle areas for 11 nozzles so specified.

The reader might wonder how the device measures sonically when each device may operate at a sub-sonic pressure ratio. The answer is that only the throat needs to be below the sonic pressure ratio. The diverging channel after the nozzle recovers part of the upstream pressure that was transformed into kinetic energy. Taken as a system with convergent and divergent channels, the device can do sonic measurements at what are apparently sub-sonic pressure ratios.

Appendix: Throttle Area Calculation Projected Throttle Area

Projected throttle area is defined as area intersected at right angles by particles that are assumed to travel parallel to the throttle bore axis. If one were to consider the actual flow particle paths, then throttle area might be significantly different than projected area.

A simplified projected throttle area formula can be derived by assuming an infinitely thin elliptical throttle plate with its minor axis equal to throttle bore diameter D that is closed at angle $\theta_{CIB}$. This angle and D define the ellipse's major axis. The diameter of the throttle shaft is zero. When closed, there is no clearance between plate and bore. Note that \theta \ refers to absolute angle, not angle relative to CIB.

$$A_{throttle} = \frac{\pi D^2}{4}\left(1 - \frac{\cos\theta}{\cos\theta_{CIB}}\right) \quad (13)$$

The parameters for the throttle we studied were:

$$\theta_{CIB} = 7° \quad D = 60 \text{ mm}$$

A more complex throttle area formula that is known in the art accounts for throttle bore blockage by the throttle shaft at large angles.

$$\frac{4A_{throttle}}{\pi D^2} = \quad (14)$$

-continued $$\left(1 - \frac{\cos\theta}{\cos\theta_{CIB}}\right) + \frac{2}{\pi}\left(\begin{array}{l}\frac{a}{\cos\theta}\sqrt{\cos^2\theta - a^2\cos^2\theta_{CIB}} + \\ \frac{\cos\theta}{\cos\theta_{CIB}}\arcsin\left(\frac{a\cos\theta_{CIB}}{\cos\theta}\right) - a\sqrt{1-a^2} - \arcsin a\end{array}\right)$$

A parameter a scales throttle shaft diameter by bore diameter.

$$a = \frac{\text{throttle shaft diameter}}{\text{bore diameter}} \quad (15)$$

The expression becomes imaginary when $$\cos^2\theta - a^2\cos^2\theta_{CIB} = 0 \quad (16)$$

Solving this equation provides an upper limit for the area approximation validity.

$$(\cos\theta - a\cos\theta_{CIB})(\cos\theta + a\cos\theta_{CIB}) = 0 \quad (17)$$

The roots are symmetric about 0^\circ, but we need only solve for the positive physical one.

$$\cos\theta = a\cos\theta_{CIB} \quad (18)$$

$$\theta = \arccos(a\cos\theta_{CIB}) \quad (1\,9)$$

Equation (19) gives the angle at which the throttle plate's projection is within the throttle shaft's projection. For the throttle tested, the ratio of throttle shaft diameter to throttle bore diameter is:

$$a = \frac{10 \text{ mm}}{60 \text{ mm}} = \frac{1}{6} \quad (20)$$

The expression's upper angle validity limit in degrees is $$\theta = \arccos\left(\frac{1}{6}\cos 7°\right) \quad (21)$$

$$\theta = 80.478° \quad (22)$$

For zero shaft diameter the a parameter is zero and the simple and complex formulas are identical.

This is the angle at which the throttle plate projection is hidden by the throttle shaft projection. Although the theoretical expression is undefined above this angle, it's clear physically that the area is bounded at the value at which the throttle shaft provides the blocking area. When the better approximation was plotted with the tested throttle's a value, it is clear the only influence of throttle shaft diameter and the complex expression was smaller predicted area in an operating region where pressure sensitivity severely limits throttle flow estimator utility.

Figure 15:
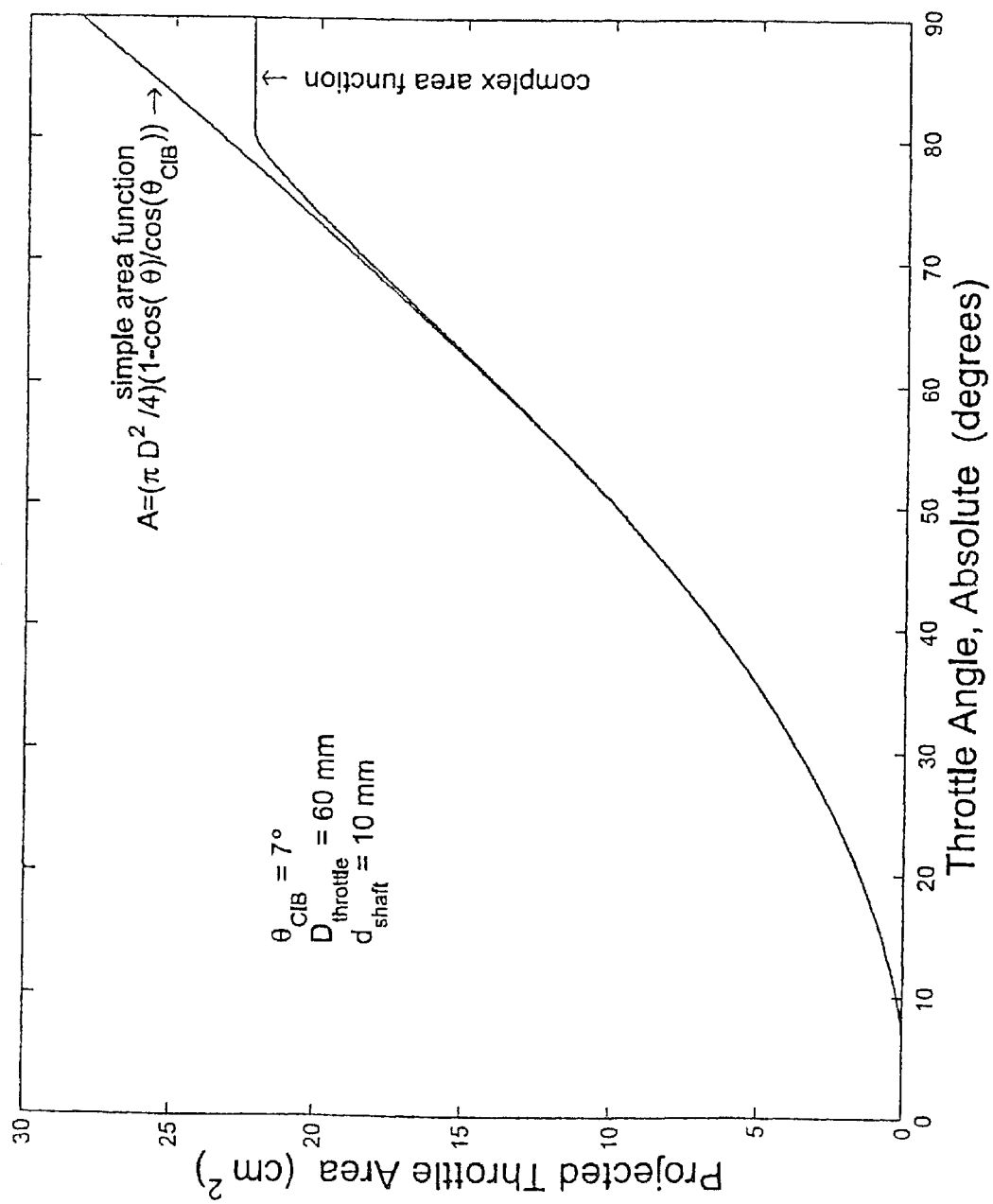
FIG. 15 is a plot of projected throttle angle as a function of absolute throttle angle showing a comparison of simple and complex projected throttle area computations.

Plotting the two expressions in FIG. 15, we see a small difference occurs only for large angles. The physical area continues to be bounded above 80.478° because of throttle shaft blockage. Neglecting this might cause considerable difficulty when interpreting data.

For our purposes, it wasn't critical to calculate an exact throttle area because the discharge coefficient strongly depends on throttle angle or area. We noted that if we use the limiting angle and evaluate the simple expression at the limiting angle, we have a fractional area value at 80.478° of:

$$\frac{4A_{throttle}}{\pi D^2} = \left(1 - \frac{\cos 80.478°}{\cos 7°}\right) = \frac{5}{6} = 0.83333 \quad (22)$$

If we evaluate the complex expression's value at the same angle, its numerical value is:

$$\frac{4A_{throttle}}{\pi D^2} = \frac{5}{6} + \frac{2}{\pi}\left[0 + \frac{\pi}{12} - \frac{1}{6}\sqrt{1 - \frac{1^2}{6}} - \arcsin\frac{1}{6}\right] = 0.78878 \quad (23)$$

The fractional error at this upper angle limit from ignoring throttle shaft blockage is 6%. At larger angles, the error is larger still.

Leak Area

Figure 16:
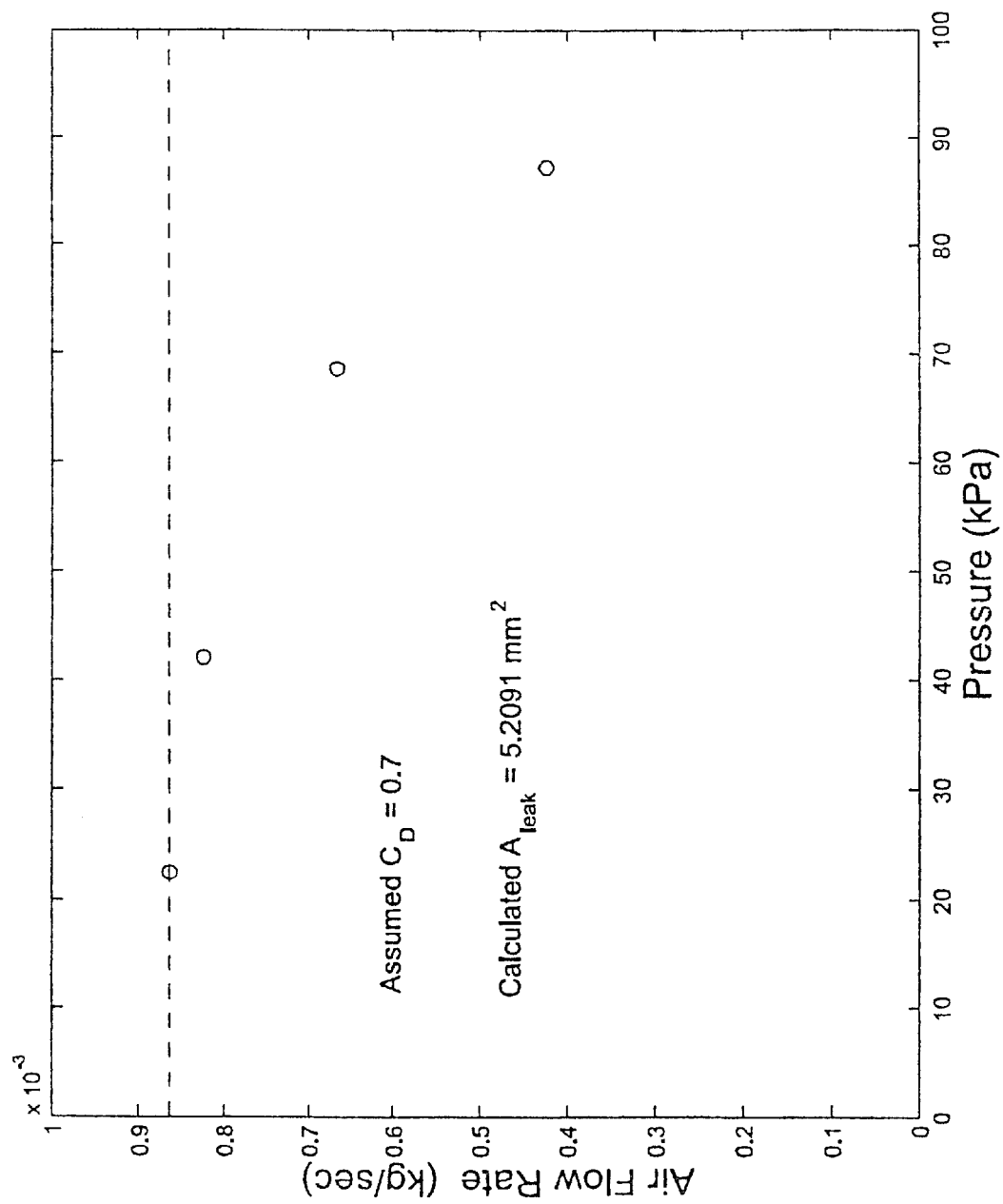
FIG. 16 is a plot of airflow rate as a function of pressure for estimating leak area.

To get good agreement at low throttle angles between theoretical Equations (2) and (5) predictions and data, it is necessary to add the effect of a throttle leak area. This area was computed from measured closed throttle airflow data plotted in FIG. 16. This "leak" data plot shows flow in this regime doesn't follow the theoretical curve of Equations (2) and (5).

Despite this disagreement, because engines are unlikely to operate at 90 kPa manifold pressure through a throttle's leak area, the highest vacuum point in this plot was used to calculate an effective throttle leak area. (It might be simpler to simply compute a leak $C_D A$, but then the hypothetical leak area size couldn't be directly compared to main bore area.)

$$\dot{m} = C_D A \sqrt{kRT_0} \frac{P_0}{RT_0} \phi_1^* \quad (24)$$

To allow a common context with the main throttle area equations, Equation 24 was used with a typical almost closed throttle discharge coefficient $C_D$ of 0.70. Solving for area:

$$A_{leak} = \dot{m}_{leak} \frac{1}{C_D} \frac{1}{\sqrt{kRT_0}} \frac{RT_0}{P_0 \phi_1^*} \quad (25)$$

The calculated leak area was 5.2 mm².

Effective leak area is significant compared to main bore area for small angles. FIG. 17 plots total throttle area versus angle, using calculated main bore area added to the leak area offset.

FIG. 17 shows that at 1° leak area is about half total flow area. Even at 4° leak area is still about 15% of total area. Leak flow $\dot{m}_{leak}$ is a large percentage of flow at small angles, so it makes no sense to scale theoretical predictions of main bore flow to experimental data without first including $A_{leak}$ into the throttle area calculation.

Appendix: Engine Flow Map

Equation (26) is a simple engine steady speed induction flow characteristic.

$$\dot{m} = \frac{(P_m - P_{offset})V_D \eta_{vol}^* N}{RT_m\left(2\frac{revolutions}{cycle}\right)} \quad (26)$$

FIG. 5 plots Equation (26) with the following parameters.

$P_{offset} = 17$ kPa $V_D = 2.5$ liter $\eta_{vol}^* = 0.9$ $T_m = -300°$ K.

$R = 0.28700 \frac{kJ}{kg \cdot °K}$

NOMENCLATURE

| Acronym | Full Name | Description |
|---|---|---|
| CIB | Closed In Bore | The throttle position where the throttle plate is the most closed. This can be either due to the plate contacting the bore or throttle shaft engaging a closed throttle stop mechanism that prevents plate to bore contact. |
| LFE | Laminar Flow Element | A group of elements scaled to the total flow rate such that flow is constrained to be laminar instead of either transitional or turbulent flow. |
| MAF | Mass Airflow sensor | |
| MAP | Manifold Absolute Pressure sensor | |
| UEGO | Universal Exhaust Gas Oxygen sensor | The UEGO measures relative fuel-air ratio over about ±30% of stoichiometric fuel-air ratio. |
| WOT | Wide Open Throttle | The throttle position where the plate is parallel to the throttle bore (90°). |
| $\eta_{vol}^*$ | | Modified volumetric efficiency. |
| $\theta_{absolute}$ | | Throttle angle. |
| $\theta_{CIB}$ | | Throttle, angle, minimum achievable. |
| $\theta_{relative}$ | | Throttle angle, relative to Closed In Bore. |
| $\phi_1$ | | Throttle mass flow function. |
| $\phi_1^*$ | | Throttle mass flow function at $r_{sonic}$. |
| $\rho$ | | Density upstream of throttle |
| a | | Ratio of D to throttle shaft diameter |
| $A_{BORE}$ | | Area, throttle bore. |
| $C_D$ | | Coefficient of discharge. |
| D | | Throttle bore diameter. |
| k | | Specific heat ratio $c_p/c_v$. |
| $mw_{air}$ | | Air molecular weight. |
| $\dot{m}$ | | Mass flow rate. |
| N | | Engine speed. |
| $P_m$ | | Intake manifold pressure. |
| $P_0$ | | Pressure upstream of nozzle. |
| $P_1$ | | Pressure at the smallest orifice area. |
| $P_2$ | | Pressure downstream of nozzle. |
| $P_3$ | | Pressure in nozzle chamber. |
| $P_4$ | | Pressure downstream of nozzles. |
| r | | Pressure ratio $P_1/P_0$, $P_2/P_0$ |
| $r_{sonic}$ | | Sonic pressure ratio. |
| R | | universal gas constant (PV = mRT). molecular weight |
| $T_0$ | | Atmospheric temperature. |
| $T_m$ | | Intake manifold gas temperature. |
| $V_D$ | | Engine displacement. |

What is claimed is:

1. A method for determining a throttle leak flow rate in a fuel delivery system, the method comprising the steps of:

determining an instantaneous throttle leak flow rate based on an estimated throttle flow rate and a measured total throttle flow rate; and adjusting a throttle leak flow rate based on the instantaneous throttle leak flow rate and an estimated throttle leak flow rate until the estimated throttle flow rate approximately equals the measured total throttle flow rate, wherein the throttle leak flow rate is adjusted by using a low pass filtering technique in accordance with the following expression:

$$\text{throttle\_leak\_flow\_rate}_{(K)} = \text{alpha} * (\text{instantaneous\_throttle\_leak\_flow\_rate}) + (1-\text{alpha}) * \text{throttle\_leak\_flow\_rate}_{(K-1)}$$

where $0 < \text{alpha} < 1$.

2. The method of claim 1, further including the step of determining an estimated total throttle flow rate based on the estimated throttle flow rate and the adjusted throttle leak flow rate.

3. The method of claim 2, further including the step of converting the estimated total throttle flow rate to a throttle leak area.

4. The method of claim 1, wherein the throttle leak flow rate is adjusted for a plurality of throttle angles.

5. The method of claim 1, wherein the throttle leak flow rate is adjusted when a throttle angle is less than four degrees.

6. A method for determining throttle flow in a fuel delivery system, the method comprising the steps of:

estimating a throttle leak flow rate based on a measured throttle flow rate and an estimated throttle flow rate;

generating an addend or offset for the estimated throttle leak flow rate by utilizing an adaptive learning process during steady state operating conditions of said fuel delivery system; and adjusting the estimated throttle leak flow rate using the addend or offset until the estimated throttle leak flow is approximately equal to the measured throttle flow rate during transient operating conditions of said fuel delivery system.

7. The method of claim 6, further including the step of determining an estimated total throttle flow rate based on the estimated throttle flow rate and the throttle leak flow rate.

8. The method of claim 7, further including the step of converting the estimated total throttle flow rate to a throttle leak area.

9. The method of claim 6, wherein the estimated throttle leak flow rate is offset by using a low pass filtering technique.

10. The method of claim 6, wherein the estimated throttle leak flow rate is offset for a plurality of throttle angles.

11. The method according to claim 6, wherein the addend or offset is determined by using a low pass filtering technique in accordance with the following expression:

$$\text{throttle\_leak\_flow\_rate}_{(K)} = \text{alpha} * (\text{instantaneous\_throttle\_leak\_flow\_rate}) + (1-\text{alpha}) * \text{throttle\_leak\_flow\_rate}_{(K-1)}$$

where $0 < \text{alpha} < 1$.

12. A method for determining throttle leak area in a fuel delivery system, the method comprising the steps of:

estimating a throttle leak area;

computing an imputed throttle leak area using an adaptive learning process during steady state operating conditions of the fuel delivery system; and adjusting the estimated throttle leak area until the estimated throttle leak area is approximately equal to the imputed throttle leak area during transient operating conditions of the fuel delivery system.

13. The method of claim 12, wherein the estimated throttle leak area is adjusted during a closed loop method of operation.

14. The method according to claim 12, wherein the imputed throttle leak area is determined by using a low pass filtering technique in accordance with the following expression:

$$\text{throttle\_leak\_flow\_rate}_{(K)} = \text{alpha} * (\text{instantaneous\_throttle\_leak\_flow\_rate}) + (1-\text{alpha}) * \text{throttle\_leak\_flow\_rate}_{(K-1)}$$

where $0 < \text{alpha} < 1$.

15. A fuel delivery system, comprising:

an adaptive learning module comprising a memory storage device for storing one or more adaptive corrective values of throttle leak flow rate as a function of throttle angle, said adaptive learning module selectively adjusting a throttle leak flow rate based on an instantaneous throttle leak flow rate and an estimated throttle leak flow rate until the estimated throttle flow rate approximately equals a measured total throttle flow rate, wherein the throttle leak flow rate is adjusted by using a low pass filtering technique in accordance with the following expression:

$$\text{throttle\_leak\_flow\_rate}_{(K)} = \text{alpha} * (\text{instantaneous\_throttle\_leak\_flow\_rate}) + (1-\text{alpha}) * \text{throttle\_leak\_flow\_rate}_{(K-1)}$$

where $0 < \text{alpha} < 1$.

16. The fuel delivery system according to claim 15, wherein the throttle leak flow rate is adjusted for a plurality of throttle angles.

17. The fuel delivery system according to claim 15, wherein the throttle leak flow rate is adjusted when a throttle angle is less than four degrees.

* * * * *